US008645638B2

(12) United States Patent
Coon et al.

(10) Patent No.: US 8,645,638 B2
(45) Date of Patent: Feb. 4, 2014

(54) SHARED SINGLE-ACCESS MEMORY WITH MANAGEMENT OF MULTIPLE PARALLEL REQUESTS

(75) Inventors: Brett W. Coon, San Jose, CA (US); Ming Y. Siu, Santa Clara, CA (US); Weizhong Xu, Fremont, CA (US); Stuart F. Oberman, Sunnyvale, CA (US); John R. Nickolls, Los Altos, CA (US); Peter C. Mills, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/466,057

(22) Filed: May 7, 2012

(65) Prior Publication Data

US 2012/0221808 A1 Aug. 30, 2012

Related U.S. Application Data

(62) Division of application No. 13/165,638, filed on Jun. 21, 2011, now Pat. No. 8,176,265, which is a division of application No. 11/554,542, filed on Oct. 30, 2006, now abandoned.

(51) Int. Cl.
*G06F 12/00* (2006.01)
*G06F 13/00* (2006.01)

(52) U.S. Cl.
USPC ........... 711/150; 711/151; 711/152; 711/154; 711/158; 711/163; 711/167; 711/168

(58) Field of Classification Search
USPC ......... 711/150, 151, 152, 154, 158, 163, 167, 711/168
See application file for complete search history.

(56) References Cited

U.S. PATENT DOCUMENTS 5,539,898 A * 7/1996 Trevett et al. ................. 711/167

* cited by examiner

*Primary Examiner* — Midys Rojas
(74) *Attorney, Agent, or Firm* — Kilpatrick Townsend & Stockton LLP

(57) ABSTRACT

A memory is used by concurrent threads in a multithreaded processor. Any addressable storage location is accessible by any of the concurrent threads, but only one location at a time is accessible. The memory is coupled to parallel processing engines that generate a group of parallel memory access requests, each specifying a target address that might be the same or different for different requests. Serialization logic selects one of the target addresses and determines which of the requests specify the selected target address. All such requests are allowed to proceed in parallel, while other requests are deferred. Deferred requests may be regenerated and processed through the serialization logic so that a group of requests can be satisfied by accessing each different target address in the group exactly once.

20 Claims, 12 Drawing Sheets

SHARED SINGLE-ACCESS MEMORY WITH MANAGEMENT OF MULTIPLE PARALLEL REQUESTS

CROSS-REFERENCES TO RELATED APPLICATIONS

This application is a divisional of U.S. patent application Ser. No. 13/165,638, filed Jun. 21, 2011, now U.S. Pat. No. 8,176,265, which is a divisional of U.S. patent application Ser. No. 11/554,542, filed Oct. 30, 2006, which are incorporated by reference. The present disclosure is related to the following commonly-assigned U.S. patent applications: application Ser. No. 11/554,552, filed Oct. 30, 2006, entitled "Shared Memory for Concurrent Threads in a Multithreaded Processor Core"; application Ser. No. 11/554,546, filed Oct. 30, 2006, entitled "Shared Memory with Parallel Access and Access Conflict Resolution Mechanism"; application Ser. No. 11/554,563, filed Oct. 30, 2006, entitled "Single Interconnect Providing Read and Write Access to a Memory Shared by Concurrent Threads"; and application Ser. No. 11/305,178, filed Dec. 15, 2005, entitled "Parallel Data Processing Systems and Methods Using Cooperative Thread Arrays." The respective disclosures of these applications are incorporated herein by reference for all purposes.

BACKGROUND OF THE INVENTION

The present invention relates in general to multithreaded processor systems and in particular to a memory that can respond to multiple parallel requests from multiple threads, where one location in the memory can be accessed at a time.

Parallel processing computer systems, including processors that can manage multiple concurrent threads, are known in the art. For large processing tasks, parallel processing can speed throughput by enabling the computer system to work on multiple independent parts of the processing task at once. For example, in graphics processors, each vertex or pixel is typically processed independently of all other vertices or pixels. Accordingly, graphics processors are usually designed with a large number of parallel processing pipelines for vertices and for pixels, allowing many vertices and/or pixels to be processed in parallel threads, which accelerates rendering of an image. The graphics pipelines usually do not share data with each other, apart from state parameters (also referred to as constants) that are usually common to large groups of vertex threads or pixel threads. The constants are usually stored in on-chip registers to which the pipelines have read access; any required updating of constants is handled via a separate control path.

For other types of processing tasks, it is sometimes desirable to allow different threads to share data. For instance, multiple threads may operate on different, overlapping parts of an input data set. As another example, it may be desirable for one thread to consume data produced by another thread. Sharing of data is usually managed by allowing multiple threads to access a common set of memory locations.

Existing shared memory systems tend to have significant overhead. In one model, shared memory is located on a separate chip from the parallel processors. Because the shared memory is off-chip, access is relatively slow. Further, semaphores or the like are typically used to prevent conflicting access requests so that, in effect, only one thread at a time has access to the shared memory. In another model, each processor in a multiprocessor parallel system maintains its own cached copy of all or part of the shared memory. Keeping the caches coherent, however, can incur considerable overhead.

It would therefore be desirable to provide a shared memory subsystem with low latency and support for multiple parallel access operations.

BRIEF SUMMARY OF THE INVENTION

Embodiments of the present invention relate to a memory for use by concurrent threads in a multithreaded processor, in which any addressable storage location is accessible by any of the concurrent threads, but only one location at a time is accessible. The memory is coupled to parallel processing engines that generate a group of parallel memory access requests, each specifying a target address that might be the same or different for different requests. Serialization logic selects one of the target addresses and determines which of the requests specify the selected target address. All such requests are allowed to proceed in parallel, while other requests are deferred. Any deferred requests may be regenerated and processed through the serialization logic so that a group of requests can be satisfied by accessing each different target address in the group exactly once. In some embodiments, the shared memory is accessed as a shared cache memory (through associative tag lookup); in others, locations in the shared memory are accessed directly by address. Accordingly, the term "shared memory" as used herein is to be understood as including cache memory as well as directly accessed memory.

According to one aspect of the present invention, a processor core includes a memory, processing engines, and serialization logic coupled between the processing engines and the memory. The memory (which may be, e.g., a cache memory) has multiple addressable storage locations, and one of the locations at a time is accessible. The processing engines are adapted to generate requests to the memory in parallel, with each request specifying a target address in the memory. The serialization logic is adapted to receive the parallel requests from the plurality of processing engines, to select one of the target addresses, and to permit all of the plurality of requests that specify the selected target address to proceed in parallel. Requests targeting other addresses are advantageously serialized, e.g., by being generated again. For example, the processor core may include an instruction unit adapted to issue a same instruction from a sequence of instructions in parallel to all of the processing engines; the sequence of instructions advantageously includes a first instruction to request access to the memory. The serialization logic can be further adapted to signal the instruction unit to issue the first instruction again to any of the processing engines for which the request did not specify the selected target address. The core may also include a distribution bus adapted to receive data read from the selected target address in the memory and to distribute the data to each of the processing engines whose request was permitted to proceed.

In some embodiments, the memory is used to store relatively static data, such as rendering constants for use in a graphics processor. Static data changes seldom (or in some instances not at all); to the extent that the data does not change from one thread of program execution to the next, requests can be satisfied in parallel.

In some embodiments, the serialization logic includes a broadcast selection module and decision logic. The broadcast selection module is adapted to select one of the target addresses as a broadcast address (e.g., based on a priority ranking among the requests, with the target address of the highest priority request being selected) and to assert a broadcast signal corresponding to each request for which the target address matches the broadcast address. For instance, the broadcast logic might include a number of comparators, each of which is adapted to compare one of the target addresses with the broadcast address and to assert or deassert the broadcast signal corresponding to that one of the target addresses based on the comparison. The decision logic can be adapted to assert or deassert a go signal for each request based at least in part on the broadcast signal.

According to another aspect of the present invention, a processor core includes a shared memory, a constants memory, processing engines, conflict logic coupled between the processing engines and the shared memory, and serialization logic coupled between the processing engines and the constants memory. The shared memory includes multiple banks, each of which provides multiple addressable storage locations, and addressable storage locations in different banks of the shared memory are accessible in parallel. The constants memory (which may be, e.g., a cache memory) also has multiple addressable storage locations, but only one of the locations at a time is accessible. The processing engines are adapted to generate requests to the shared memory in parallel, with each shared memory request specifying a target address in the shared memory. The processing engines are also adapted to generate a plurality of requests to the constants memory in parallel, with each constants memory request specifying a target address in the constants memory. The conflict logic is adapted to receive the shared memory requests in parallel from the processing engines, to select a satisfiable set from the received requests, the satisfiable set including requests specifying at most one target location in each of the banks of the shared memory, and to deliver the satisfiable set of requests in parallel to the shared memory. The serialization logic is adapted to receive the constants memory requests from the processing engines in parallel, to select one of the target addresses in the constants memory, and to permit all of the requests that specify the selected target address in the constants memory to proceed in parallel.

In some embodiments, each of the processing engines is adapted to generate a request to the shared memory and a request to the constants memory in parallel. The conflict logic and the serialization logic may also be adapted to operate in parallel with each other, and the shared memory and the constants memory may also be adapted to operate in parallel with each other. Thus, a group of request to the shared memory can be made and processed in parallel with a group of requests to the constants memory.

According to still another aspect of the present invention, a method is provided for accessing a memory in a processor core. In parallel, multiple requests to access a memory having a plurality of addressable storage locations are generated. Each request specifies a target address in the memory. One of the target addresses is selected as a broadcast address. The broadcast address is transmitted to the memory, and the data stored at the broadcast address is accessed. The data is distributed in parallel to each of the processing engines that generated a request specifying the broadcast address as the target address. In some embodiments, if one or more of the requests specifies an address other than the broadcast address, the one or more requests that specify an address other than the broadcast address are subsequently regenerated.

The following detailed description together with the accompanying drawings will provide a better understanding of the nature and advantages of the present invention.

DETAILED DESCRIPTION OF THE INVENTION

Embodiments of the present invention relate to a memory for use by concurrent threads in a multithreaded processor, in which any addressable storage location is accessible by any of the concurrent threads, but only one location at a time is accessible. The memory is coupled to parallel processing engines that generate a group of parallel memory access requests, each specifying a target address that might be the same or different for different requests. Serialization logic selects one of the target addresses and determines which of the requests specify the selected target address. All such requests are allowed to proceed in parallel, while other requests are deferred. Any deferred requests may be regenerated and processed through the serialization logic so that a group of requests can be satisfied by accessing each different target address in the group exactly once. In some embodiments, the shared memory is accessed as a shared cache memory (through associative tag lookup); in others, locations in the shared memory are accessed directly by address. Accordingly, the term "shared memory" as used herein is to be understood as including cache memory as well as directly accessed memory. The shared memory can be implemented on-chip with a processing core, providing low-latency access and low power consumption.

System Overview

Figure 1:
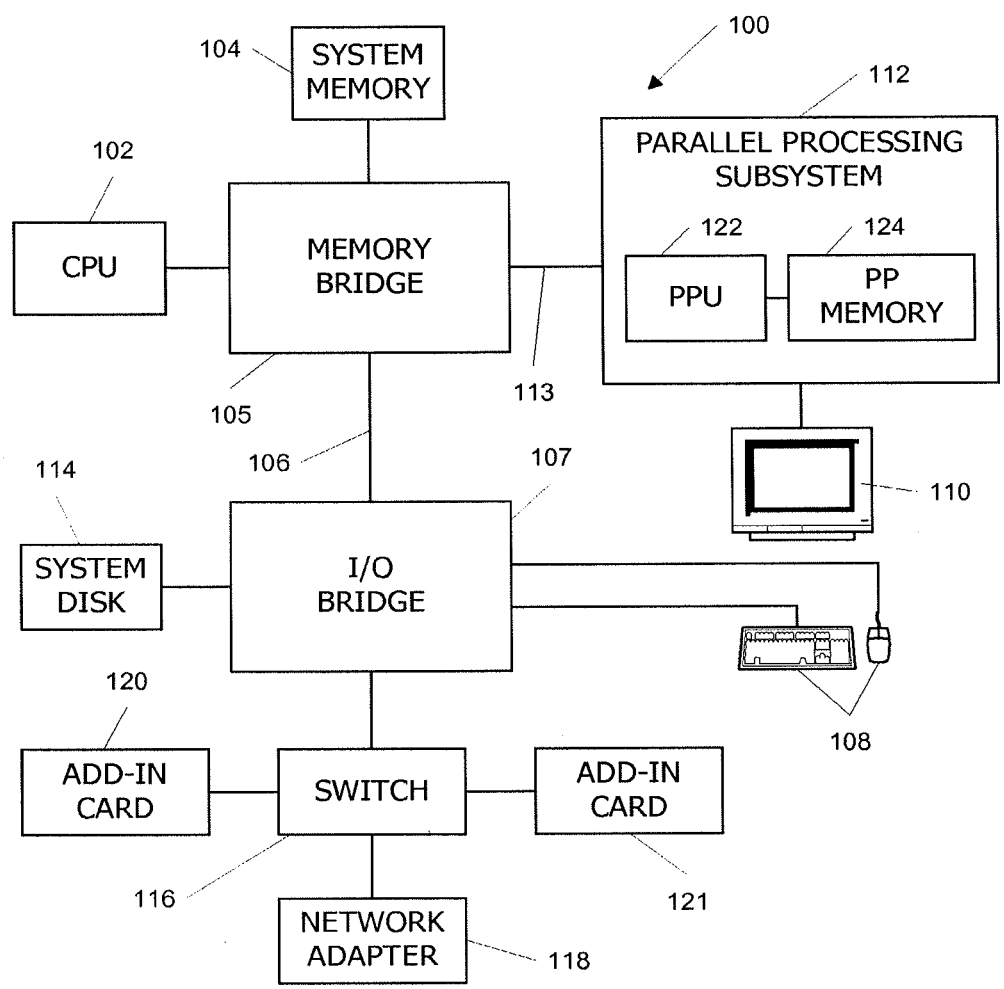
FIG. 1 is a block diagram of a computer system 100 according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express or Accelerated Graphics Port link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, e.g., using one or more integrated circuit devices such as programmable processors, application specific integrated circuits (ASICs), and memory devices. PPU 122 advantageously implements a highly parallel processor including one or more processing cores, each of which is capable of executing a large number (e.g., hundreds) of threads concurrently. PPU 122 can be programmed to perform a wide array of computations, including data transforms such as FFTs. PPU 122 may transfer data from system memory 104 and/or PP memory 124 into internal memory, process the data, and write result data back to system memory 104 and/or PP memory 124, where such data can be accessed by other system components, including, e.g., CPU 102. In some embodiments, PPU 122 is a graphics processor that can also be configured to perform various tasks related to generating pixel data from graphics data supplied by CPU 102 and/or system memory 104 via memory bridge 105 and bus 113, interacting with PP memory 124 (which can be used as graphics memory including, e.g., a conventional frame buffer) to store and update pixel data, delivering pixel data to display device 110, and the like. In some embodiments, PP subsystem 112 may include one PPU 122 operating as a graphics processor and another PPU 122 used for general-purpose computations, and the PPUs may be identical or different, and each PPU may have its own dedicated PP memory device(s) or no dedicated PP memory device(s).

CPU 102 operates as the master processor of system 100, controlling and coordinating operations of other system components. In particular, CPU 102 issues commands that control the operation of PPU 122. In some embodiments, CPU 102 writes a stream of commands for PPU 122 to a command buffer, which may be in system memory 104, PP memory 124, or another storage location accessible to both CPU 102 and PPU 122. PPU 122 reads the command stream from the command buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, PP system 112 is implemented as an add-in card that can be inserted into an expansion slot of system 100. In other embodiments, a PPU can be integrated on a single chip with a bus bridge, such as memory bridge 105 or I/O bridge 107. In still other embodiments, some or all elements of PPU 122 may be integrated with CPU 102.

A PPU may be provided with any amount of local PP memory, including no local memory, and may use local memory and system memory in any combination. For instance, PPU 122 can be a graphics processor in a unified memory architecture (UMA) embodiment; in such embodiments, little or no dedicated graphics (PP) memory is provided, and PPU 122 would use system memory exclusively or almost exclusively. In UMA embodiments, the PPU may be integrated into a bridge chip or provided as a discrete chip with a high-speed link (e.g., PCI-E) connecting the PPU to the bridge chip and system memory.

It is also to be understood that any number of PPUs may be included in a system, e.g., by including multiple PPUs on a single add-in card or by connecting multiple graphics cards to path 113. Multiple PPUs may be operated in parallel to process data at higher throughput than is possible with a single PPU.

Systems incorporating PPUs may be implemented in a variety of configurations and form factors, including desktop, laptop, or handheld personal computers, servers, workstations, game consoles, embedded systems, and so on.

Core Overview

Figure 2:
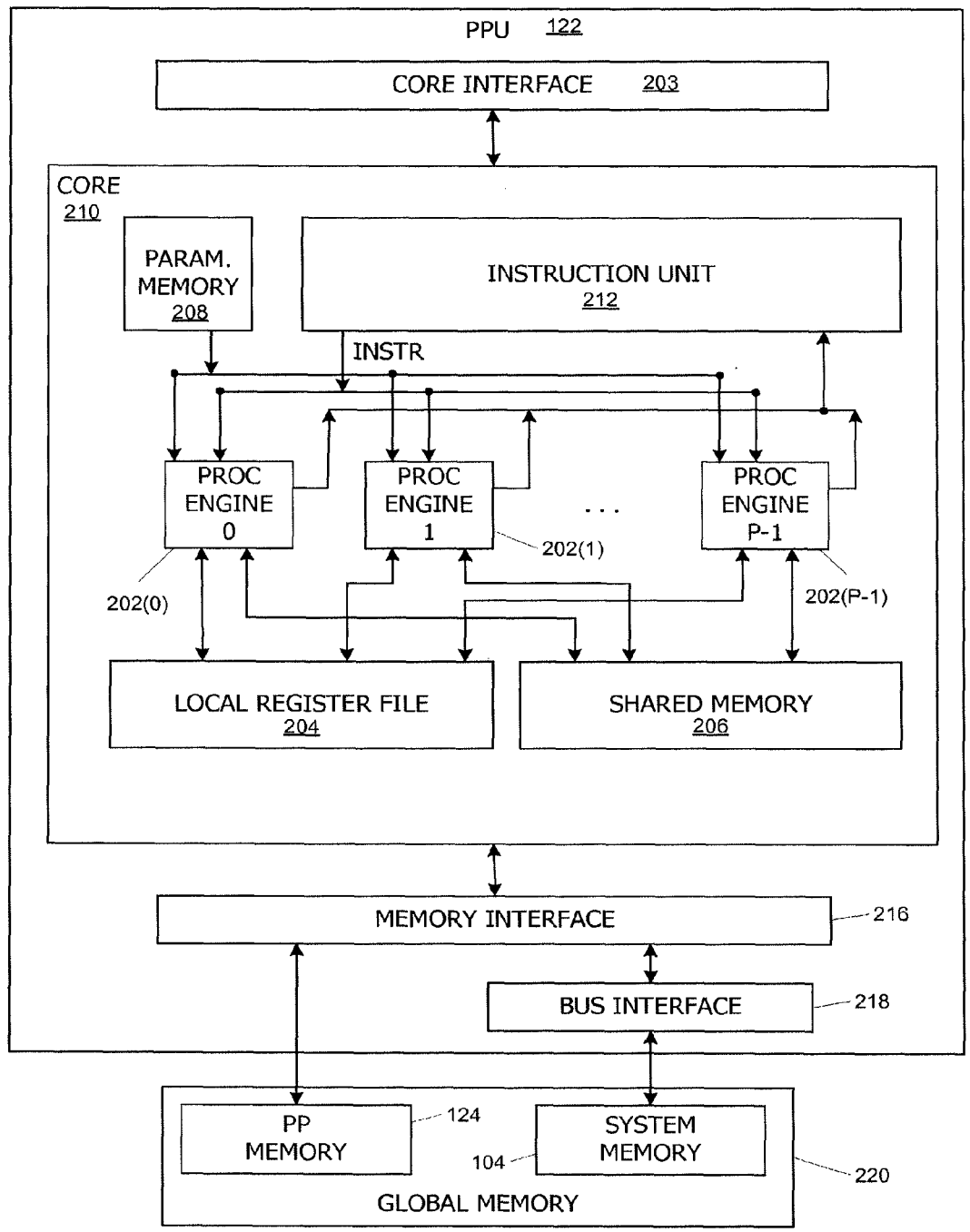
FIG. 2 is a block diagram of a graphics processing unit usable in an embodiment of the present invention.

FIG. 2 is a block diagram of a PPU 122 usable in an embodiment of the present invention. PPU 122 includes a core 210 configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, core 210 includes an array of P (e.g., 8, 16, etc.) parallel processing engines 202 configured to receive SIMD instructions from a single instruction unit 212. Each processing engine 202 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 202 uses space in a local register file (LRF) 204 for storing its local input data, intermediate results, and the like. In one embodiment, local register file 204 is physically or logically divided into P lanes, each having some number of entries (where each entry might store, e.g., a 32-bit word). One lane is assigned to each processing engine 202, and corresponding entries in different lanes can be populated with data for different threads executing the same program to facilitate SIMD execution. In some embodiments, each processing engine 202 can only access LRF entries in the lane assigned to it. The total number of entries in local register file 204 is advantageously large enough to support multiple concurrent threads per processing engine 202.

Each processing engine 202 also has access to an on-chip shared memory 206 that is shared among all of the processing engines 202 in core 210. Shared memory 206 may be as large as desired, and in some embodiments, any processing engine 202 can read to or write from any location in shared memory 206 with equally low latency (e.g., comparable to accessing local register file 204). In some embodiments, shared memory 206 can be implemented using shared cache memory. An example implementation of shared memory 206 is described below.

In addition to shared memory 206, some embodiments also provide additional on-chip parameter memory and/or cache(s) 208, which may be implemented, e.g., as a conventional RAM or cache. Parameter memory/cache 208 can be used, e.g., to hold state parameters and/or other data (e.g., textures or primitives for a shader program) that may be needed by multiple threads. Processing engines 202 also have access via a memory interface 216 to additional off-chip global memory 220, which includes, e.g., PP memory 124 and/or system memory 104, with system memory 104 being accessible by memory interface 216 via a bus interface 218; it is to be understood that any memory external to PPU 122 may be used as global memory 220. Memory interface 216 and bus interface 218 may be of generally conventional design, and other appropriate interfaces may be substituted. Processing engines 202 are advantageously coupled to memory interface 216 via an interconnect (not explicitly shown) that allows any processing engine 202 to access global memory 220.

In one embodiment, each processing engine 202 is multithreaded and can execute up to some number G (e.g., 24) of threads concurrently, e.g., by maintaining current state information associated with each thread in a different portion of its assigned lane in local register file 204. Processing engines 202 are advantageously designed to switch rapidly from one thread to another so that instructions from different threads can be issued in any sequence without loss of efficiency.

Instruction unit 212 is configured such that, for any given processing cycle, the same instruction (INSTR) is issued to all P processing engines 202. Thus, at the level of a single clock cycle, core 210 implements a P-way SIMD microarchitecture. Since each processing engine 202 is also multithreaded, supporting up to G threads, core 210 in this embodiment can have up to P*G threads executing concurrently. For instance, if P=16 and G=24, then core 210 supports up to 384 concurrent threads.

Because instruction unit 212 issues the same instruction to all P processing engines 202 in parallel, core 210 is advantageously used to process threads in "SIMD groups." As used herein, a "SIMD group" refers to a group of up to P threads of execution of the same program on different input data, with one thread of the group being assigned to each processing engine 202. (A SIMD group may include fewer than P threads, in which case some of processing engines 202 will be idle during cycles when that SIMD group is being processed.) Since each processing engine 202 can support up to G threads, it follows that up to G SIMD groups can be executing in core 210 at any given time.

On each clock cycle, one instruction is issued to all P threads making up a selected one of the G SIMD groups. To indicate which thread is currently active, a "group index" (GID) for the associated thread may be included with the instruction. Processing engine 202 uses group index GID as a context identifier, e.g., to determine which portion of its assigned lane in local register file 204 should be used when executing the instruction. Thus, in a given cycle, all processing engines 202 in core 210 are nominally executing the same instruction for different threads in the same group. (In some instances, some threads in a group may be temporarily idle, e.g., due to conditional or predicated instructions, divergence at branches in the program, or the like.)

Operation of core 210 is advantageously controlled via a core interface 203. In some embodiments, core interface 203 receives data to be processed (e.g., vertex data and/or pixel data) as well as state parameters and commands defining how the data is to be processed (e.g., what program is to be executed). Core interface 203 can load data to be processed into shared memory 206 and parameters into parameter memory 208. Core interface 203 also initializes each new thread or SIMD group in instruction unit 212, then signals instruction unit 212 to begin executing the threads. When execution of a thread or SIMD group is completed, core 210 advantageously notifies core interface 203. Core interface 203 can then initiate other processes, e.g., to retrieve output data from shared memory 206 and/or to prepare core 210 for execution of additional threads.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 210 is shown, a PPU 122 may include any number of cores 210, with appropriate work distribution logic to distribute incoming processing tasks among the available cores 210, further increasing the processing capacity. Each core 210 advantageously operates independently of other cores 210 and has its own processing engines, shared memory, and so on. Where multiple cores 210 are present, PPU 122 may include a work distribution unit (not explicitly shown) that distributes processing tasks among the available cores.

In accordance with some embodiments of the present invention, multithreaded processing core 210 of FIG. 2 can execute graphics shader programs such as pixel shaders, vertex shaders, and geometry shaders. As is known in the art, graphics processing generally includes a vertex stage, a rasterization stage, and a pixel (or fragment) stage. At the vertex stage, individual vertices of primitives that define various objects in a scene are manipulated (e.g., transformed) in accordance with the instructions of a vertex shader program. Additionally, if a geometry shader program is provided, primitives (groups of vertices) may also be manipulated. Rasterization determines which primitives are visible in which pixels of the rendered image. In the pixel stage, a color is determined for each pixel based on the primitive(s) that cover that pixel, in accordance with instructions of a pixel shader program. Core 210 is advantageously configurable for concurrent execution of vertex shader threads, pixel shader threads, and/or geometry shader threads. For example, where core 210 executes multiple SIMD groups, one SIMD group might consist of up to P vertex threads while a different SIMD group consists of up to P pixel threads.

Traditionally, a vertex shader program manipulates each vertex independently, and a pixel shader program manipulates each pixel independently. Thus, when core 210 executes graphics threads, sharing of information (other than state parameters for the various shaders) between threads might not be required.

During graphics processing, however, processing engines in core 210 advantageously have access to shared memory 206, and shared memory 206 may be used to store data for each thread, regardless of whether the data is shared among threads. For instance, in the case of vertex threads, shared memory 206 can be used to store the input vertex data and/or the output vertex data for each thread.

To the extent that sharing of data among graphics threads is desirable, core 210 can exploit shared memory 206 to support data sharing. For instance, it has been proposed to introduce geometry shader programs that manipulate primitives (or groups of primitives) rather than individual vertices. It is possible that one vertex could be a part of multiple primitives. Accordingly, in some embodiments, shared memory 206 can be used to store input data for a geometry shader program, making data for a particular vertex available to any thread that needs it.

As another example, in some pixel shader algorithms, it is useful to approximate the derivative of some attribute of the primitive at the pixel location. This can be done by comparing values of the attribute in adjacent pixels. In some embodiments, the attribute values for neighboring (e.g., adjacent) pixels are all stored in predictable places in shared memory 206, and shared memory 206 can be used to support sharing of pixel data (referred to herein as "swizzling") among threads processing neighboring pixels. Another embodiment of the present invention that supports pixel swizzling where pixel attribute values are stored in LRF 204 is described below.

In addition to graphics operations, some embodiments of multithreaded processing core 210 of FIG. 2 can also execute general-purpose computations using cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. Examples include matrix algebra, linear and/or nonlinear transforms in any number of dimensions (e.g., fast Fourier transforms), and various filtering algorithms including convolution filters in any number of dimensions, separable filters in multiple dimensions, and so on. The processing algorithm to be applied to each portion of the input data set is specified in a "CTA program," and each thread in a CTA executes the same CTA program on one portion of the input data set. A CTA program can implement algorithms using a wide range of mathematical and logical operations, and the program can include conditional or branching execution paths and direct and/or indirect memory access.

Threads in a CTA can share input data, processing parameters, and/or intermediate results with other threads in the same CTA using shared memory 206. In some embodiments, a CTA program includes an instruction to compute an address in shared memory 206 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 206 from which data is to be read, with the address being a function of thread ID. By defining suitable functions and providing synchronization techniques, data can be written to a given location in shared memory 206 by one thread and read from that location by a different thread in a predictable manner. Consequently, any desired pattern of data sharing among threads can be supported, and any thread in a CTA can share data with any other thread in the same CTA.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 206, then synchronize. Each thread performs the row-filter for one point of the data set and writes the intermediate result to shared memory 206. After all threads have written their row-filter results to shared memory 206 and have synchronized at that point, each thread performs the column-filter for one point of the data set. In the course of performing the column filter, each thread reads the appropriate row-filter results from shared memory 206, and a thread may read row-filter results that were written by any thread of the CTA. The threads write their column-filter results to shared memory 206. The resulting data array can be stored to global memory or retained in shared memory 206 for further processing. Where shared memory 206 can be accessed with lower latency and/or greater bandwidth than global memory, storing intermediate results in shared memory 206 advantageously improves processor throughput.

Since all threads in a CTA execute the same program, any thread can be assigned any thread ID, as long as each valid thread ID is assigned to only one thread. In one embodiment, thread IDs are assigned sequentially to threads as they are launched, as described in above-referenced application Ser. No. 11/305,178. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (T) of threads, thread IDs are simply sequential (one-dimensional) index values from 0 to T−1. In other embodiments, multidimensional indexing schemes can be used.

In addition to thread IDs, some embodiments also provide a CTA identifier that is common to all threads in the CTA. CTA identifiers can be helpful, e.g., where an input data set is to be processed using multiple CTAs that process different (possibly overlapping) portions of an input data set. The CTA identifier may be stored in a local register of each thread, in a state register accessible to all threads of the CTA, or in other storage accessible to the threads of the CTA. While all threads within a CTA are executed concurrently, there is no requirement that different CTAs are executed concurrently, and the hardware need not support sharing of data between threads in different CTAs.

It will be appreciated that the size (number of threads) of a CTA and number of CTAs required for a particular application will depend on the application. Thus, the size of a CTA, as well as the number of CTAs to be executed, are advantageously defined by a programmer or driver program and provided to core 210 and core interface 203 as state parameters.

CTAs are described in further detail in above-referenced application Ser. No. 11/305,178. Those skilled in the art will appreciate that use of shared memory according to an embodiment of the present invention is not limited to CTAs or graphics; shared memory as described herein can be used in any circumstance where two or more concurrent threads in a processing core benefit from sharing input data, output data, and/or intermediate result data.

Shared Memory Example

In some embodiments, shared memory 206 is advantageously implemented within core 210, in close proximity to processing engines 202, allowing processing engine 202 to access shared memory 206 with low latency. Shared memory 206 may be implemented using known data storage circuits such as dynamic or static random-access memories (DRAM or SRAM), register arrays, cache circuits, or the like. Low access latency allows shared memory 206 to be used as a working memory that can be accessed frequently while maintaining high throughput in processor core 210. In some embodiments, shared memory 206 can be accessed with a latency comparable to local register file 204.

In addition, placing shared memory 206 in close proximity to processing engines 202 can help reduce power dissipation in core 210. In some low-power implementations, shared memory 206 is implemented using circuits that support location-based addressing (e.g., SRAM circuits) rather than associative tag lookup (e.g., cache circuits).

As noted above, core 210 advantageously executes SIMD groups of threads, and threads in a SIMD group execute the same instruction in parallel. Thus, a group of threads may simultaneously request access to one or more target locations in shared memory 206. In some instances (e.g., for CTA threads), each thread independently computes a target address in shared memory 206, and there is no guaranteed relationship among the target addresses computed by different threads in a SIMD group. For instance, all threads in a SIMD group might compute the same target address (e.g., to obtain a processing parameter such as a filter coefficient), or the threads might compute different target addresses separated by a consistent "stride" (e.g., 1, 2, or 4 words) or different addresses separated by varying strides. In other instances, some but not all threads may compute the same target address, while other threads compute different target addresses. In short, parallel requests from a SIMD group may target any combination of the locations in shared memory 206. For optimum execution, shared memory 206 is advantageously designed to support parallel access by multiple processing engines to multiple independently computed target addresses.

In some embodiments, shared memory 206 is both readable and writeable by the threads executing in processing engines 202, and any thread can read from and write to any location in shared memory 206. In one embodiment, read access to shared memory 206 is available through a "load.shared" instruction:

load.shared $R_D$, $[A_{eff}]$, which transfers data from the effective address $A_{eff}$ in shared memory 206 to a destination register $R_D$ in the lane of local register file 204 assigned to the processing engine 202 that executes the load.shared instruction. Similarly, write access to shared memory 206 is available through a "store.shared" instruction:

store.shared $[A_{eff}]$, $R_S$, which transfers data from a source register $R_S$ in the lane of local register file 204 assigned to the processing engine 202 that executes the store.shared instruction to an effective address $A_{eff}$ in shared memory 206. In one embodiment, the effective address $A_{eff}$ for load.shared and store.shared operations is stored in one of the registers in the assigned lane of local register file 204; in another embodiment, the effective address is determined by adding an offset to a virtual address stored in one of the registers in the assigned lane of local register file 204, as described below. In some embodiments, the effective address $A_{eff}$ can also be provided as an immediate operand.

Figure 3:
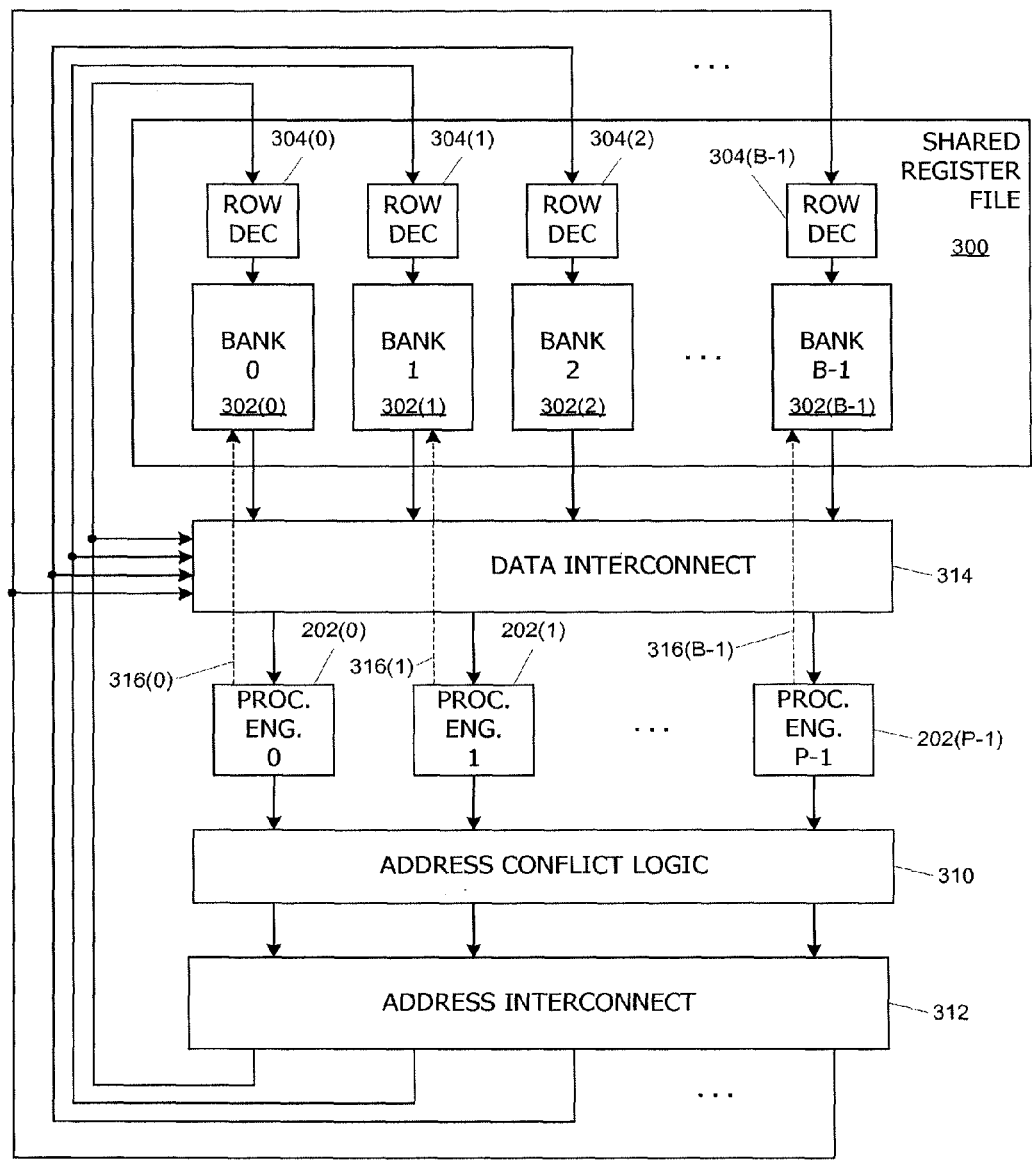
FIG. 3 is a block diagram of a shared register file implementing a shared memory according to an embodiment of the present invention.

FIG. 3 is a block diagram of a shared register file (SRF) 300 implementing shared memory 206 of FIG. 2 according to an embodiment of the present invention. In this embodiment, SRF 300 includes a number (B) of banks 302, each of which can be implemented as a single-ported SRAM that includes some number of rows (not explicitly shown). Each row (also referred to herein as an "entry") in a bank 302 may store, e.g., a 32-bit word or other convenient unit of data. Each bank 302 has an independent row decoder 304, allowing each bank 302 to be independently addressed. Up to one entry in each bank 302 can be accessed in parallel without requiring any correlation between the accessed entries in different banks 302; in other words, any entry in one bank (e.g., bank 302(0)) can be accessed in parallel with any entry in another bank (e.g., bank 302(2)). SRF 300 may include any number B of banks 302 (e.g., 2, 4, 8, 16, etc.). In some embodiments, the number B of banks 302 is at least as large as the number P of processing engines 202; where this is the case, at least some combinations of parallel access requests to SRF 300 can be satisfied in parallel, as described below. Each bank 302 may include any number of rows, e.g., 256, 512 or 1K, and the same number of rows is advantageously included in each bank 302.

Figure 4:
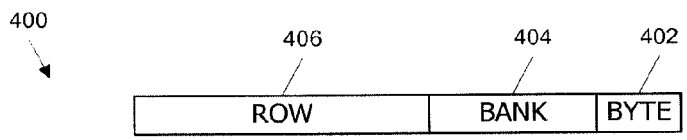
FIG. 4 illustrates one address format that can be used for byte-addressable data in a shared memory according to an embodiment of the present invention.

Each entry in SRF 300 advantageously has a unique address. FIG. 4 illustrates one address format that can be used for byte-addressable data. An address 400 has a number of bits large enough to represent each byte in SRF 300; e.g., if the total capacity of SRF 300 is 16 KB, address 400 is advantageously 14 bits. For 32-bit words, the lowest two bits of address 400 are a byte field 402 that can be used to identify a specific byte within a word. The remaining bits identify the word (or entry if each entry is one word). More specifically, a bank field 404 includes $\log_2 B$ bits; for instance, if B is 16, then bank field 404 would include 4 bits. A row field 406 includes enough bits to allow each row in one bank 302 to have a unique identifier; for instance, if each bank 302 has 256 rows, row field 406 would include 8 bits. Address 400 interleaves banks 302 at word granularity; in other words, consecutive word-level addresses (i.e., addresses ending in "00") are in different banks 302.

It should also be noted that where SRF 300 is byte-addressable, load.shared and store.shared instructions can transfer less than a word of data. In one embodiment, data can be transferred in units of 1, 2, or 4 bytes. During a load operation to a 32-bit local register in local register file 204, any data unit smaller than a word can be zero-extended or sign-extended to the full width of the local register. During a store operation, any data unit smaller than a word is advantageously written to the appropriate subset of the word in SRF 300, leaving the rest of the bits unmodified.

Referring again to FIG. 3, there is also shown a communication path between SRF 300 and processing engines 202 for an embodiment where processing engines 202 are operated in SIMD fashion as described above. To execute an SRF read operation (e.g., a load.shared instruction), each processing engine 202 delivers a target address for one thread of a SIMD group to address conflict logic 310. Address conflict logic 310 enforces the condition that only one entry per bank 302 can be accessed in parallel. More specifically, address conflict logic 310 compares the target addresses provided by different processing engines 202 and detects cases where two or more target addresses are in the same bank (referred to herein as a "conflict"). Where a conflict exists, address conflict logic 310 selects one of the conflicting target addresses to be processed in the current operation and signals instruction unit 212 (FIG. 2) to retry the conflicting target addresses that were not selected. Operation of address conflict logic 310 is described further below.

The addresses selected by address conflict logic 310 are delivered to an address interconnect 312. Address interconnect 312 may be implemented, e.g., as a full crossbar allowing a target address originating from any one of processing engines 202 to be delivered to any one of row decoders 304.

Each row decoder 304, which may be of generally conventional design, accesses the entry in the corresponding bank 302 specified by the received target address. Bank 302 delivers read data from the target address to a data interconnect 314. Data interconnect 314, which may be implemented, e.g., as a full crossbar, can deliver a data word from any one of the banks 302 to any one (or more) of processing engines 202. In this manner, any processing engine 202 can access any bank 302 in SRF 300.

In some embodiments, a second data interconnect (not explicitly shown) can be provided to deliver data from the processing engines 202 to banks 302 during a write operation (e.g., a store.shared operation). The second data interconnect can also be implemented as a full crossbar such that data originating from any processing engine 202 can be delivered to any bank 302 in SRF 300.

In other embodiments, a second data interconnect is not provided. Instead, a direct write path 316 (shown as a dashed line) is provided from one of the processing engines 202 to each of the SRF banks 302. In embodiments where the number B of banks 302 is equal to the number P of processing engines 202, each processing engine 202 has a direct write path 316 to a different SRF bank 302. For a write operation, read data interconnect 314 is leveraged to obtain write source data, and direct write paths 316 from processing engines 202 to SRF banks 302 are used to deliver the write source data to the desired location in SRF 300. One such embodiment is described below.

It should be noted that direct write paths 316 can be implemented regardless of whether P=B. For instance, in some embodiments where P>B, B of the processing engines 302 each have a direct write path, and up to B data values can be written in parallel. In embodiments where P<B, some processing engines 302 may have more than one direct write path to different SRF banks 302; since only one of the direct write paths from a single processing engine 302 can be used at once, at most P data values can be written in parallel. Thus, in general, direct write paths 316 provide a write bandwidth corresponding to min(B, P).

Virtual Addressing

In some embodiments, processing engines 202 support virtual addressing into SRF 300. Virtual addressing allows blocks of memory within SRF 300 to be allocated to a particular group of concurrent threads. For instance, in the case of CTAs, a block might be allocated to a specific CTA, meaning that the block is accessible to all threads of that CTA and not accessible to any other threads, including threads of any other CTAs that may be concurrently executing in core 210. In the case of shader threads, a SIMD group might be allocated a block of SRF space. Allocation of space within SRF 300 can be managed, e.g., by core interface 203 of FIG. 2; conventional techniques for resource allocation can be used.

Figure 5:
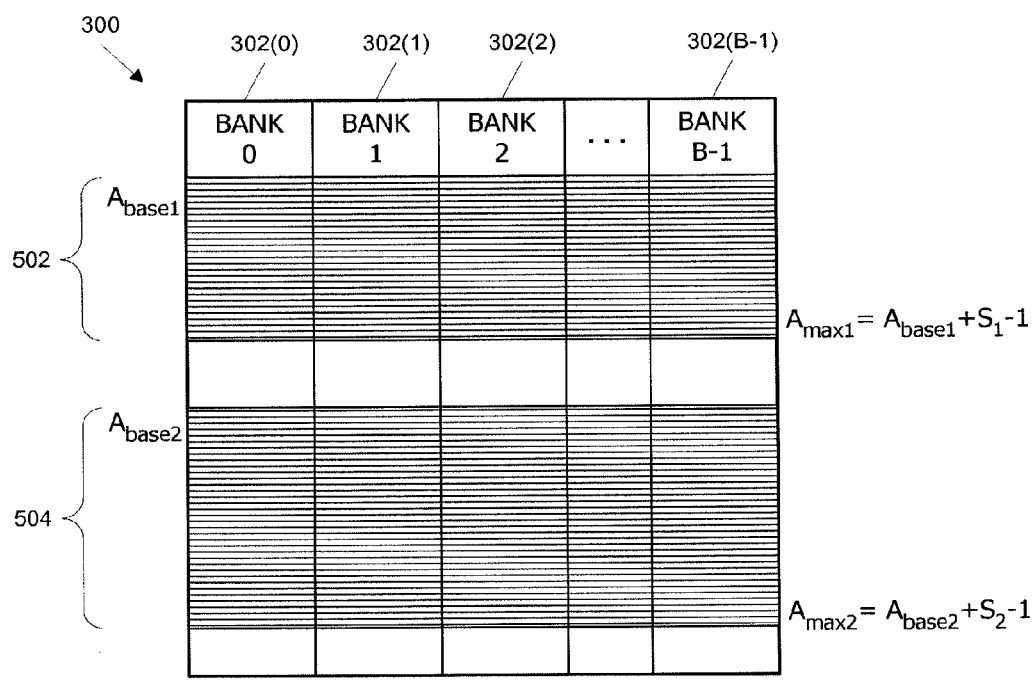
FIG. 5 illustrates virtual addressing in a shared register file according to an embodiment of the present invention.

FIG. 5 illustrates virtual addressing in SRF 300 according to an embodiment of the present invention. A block 502 of size $S_1$ words (or entries) is allocated to a first set of threads, which might be, e.g., the threads of a first CTA or a first SIMD group of shader threads for a rendering operation. The set of threads to which block 502 is allocated can include any number of threads, up to the maximum number (e.g., P*G) supported by core 210. The size $S_1$ is advantageously a multiple of the number B of banks in SRF 300. (If an allocation size that is not a multiple of B is requested, the size can be rounded up to the next multiple of B). Block 502 advantageously begins at a word address $A_{base1}$ that is assigned when the set of threads (e.g., CTA) is loaded and launched and ends at a word address $A_{max1}$ equal to $A_{base1}+S_1-1$. (It is to be understood that although word addresses are used in FIG. 5 for simplicity, byte addresses could also be used.) For the address format of FIG. 4, physical addresses are interleaved across all the banks, and block 502 consists of $S_1/B$ corresponding entries in each bank 302 of SRF 300.

Similarly, a block 504 of size $S_2$ words (or entries) can be allocated to a second set of threads, e.g., the threads of a second CTA or a second SIMD group of shader threads. Block 504 begins at a word address $A_{base2}$ that is assigned when the set of threads is loaded and launched and ends at a word address $A_{max2}$ equal to $A_{base2}+S_2-1$. It should be noted that size $S_2$ might or might not be equal to size $S_1$. For instance, in the case of a CTA, the threads of the second CTA might be executing the same CTA program as threads of the first CTA or a different program that requires a different amount of shared memory. In the case of shader threads, threads in different SIMD groups might be executing the same type of shader (e.g., vertex or pixel) or different types of shaders that might or might not require the same amount of shared memory.

A CTA program, shader program, or other program to be executed in core 210 can identify locations to be accessed in SRF 300 using "virtual" addresses $A_v$ in the appropriate interval, e.g., [0, $S_1$) or [0, $S_2$). As the threads are being loaded into core 210, a contiguous block of entries within SRF 300, e.g., starting at address $A_{base1}$ and ending at address $A_{max1}$, is allocated. In one embodiment, the first allocation starts at a base address $A_{base1}=0X0$; the base address $A_{base2}$ for the next allocation can be address $S_1$ (or more generally $A_{base1}+S_1$); and so on. The base address for each set of threads is provided as a state parameter to the processing engines 202. During SRF access operations, processing engines 202 determine an effective address $A_{\text{eff}}$ by adding the appropriate base address (e.g., $A_{base1}$ or $A_{base2}$, depending on which thread is being executed) to the virtual address $A_v$ specified in the CTA program. This effective address is delivered to address conflict logic 310 of FIG. 3. In some embodiments, processing engines 202 may also perform range checking to ensure that $A_{\text{eff}}$ is in the allocated range, e.g., $[A_{base1}, A_{max1}]$ or $[A_{base2}, A_{max2}]$. Alternatively, processing engines 202 can perform range checking in parallel with computing $A_{\text{eff}}$, e.g., by verifying that $A_v$ is in the allocated range, e.g., $[0, S_1)$ or $[0, S_2)$.

It is to be understood that virtual addressing is optional. Where it is supported, virtual addressing can be used for any program that can execute in core 210, including but not limited to graphics shader programs and CTAs. Offset-based virtual addressing as described herein advantageously allows multiple independent sets of threads (e.g., two different CTAs or two different types of shader threads) to execute concurrently in core 210 in a manner that is transparent to the programmer. Offset-based virtual addressing also provides fast address translation at execution time. In addition, to the extent that a programmer optimizes the program code to avoid bank conflicts, the offset-based virtual addressing described herein preserves those optimizations.

Address Conflict Logic

As noted above, access requests to SRF 300 (e.g., load.shared or store.shared) are advantageously made in parallel for multiple threads (e.g., a SIMD group). A group of parallel requests can include up to P independently-determined addresses, one from each processing engine. There is no guaranteed relationship between addresses determined by different processing engines, and in particular, it is possible that two or more of the addresses might be in the same bank 302 in SRF 300. Where banks 302 are implemented using single-ported memory circuits, only one address in each bank can be accessed at a time. To handle conflicting addresses (two or more addresses in the same bank), core 210 advantageously includes address conflict logic 310 as shown in FIG. 3. Address conflict logic 310 advantageously detects conflicting addresses and allows at most one address per bank 302 to be delivered to SRF 300; any requests whose addresses are not delivered can be retried until all requests are eventually satisfied.

Figure 6:
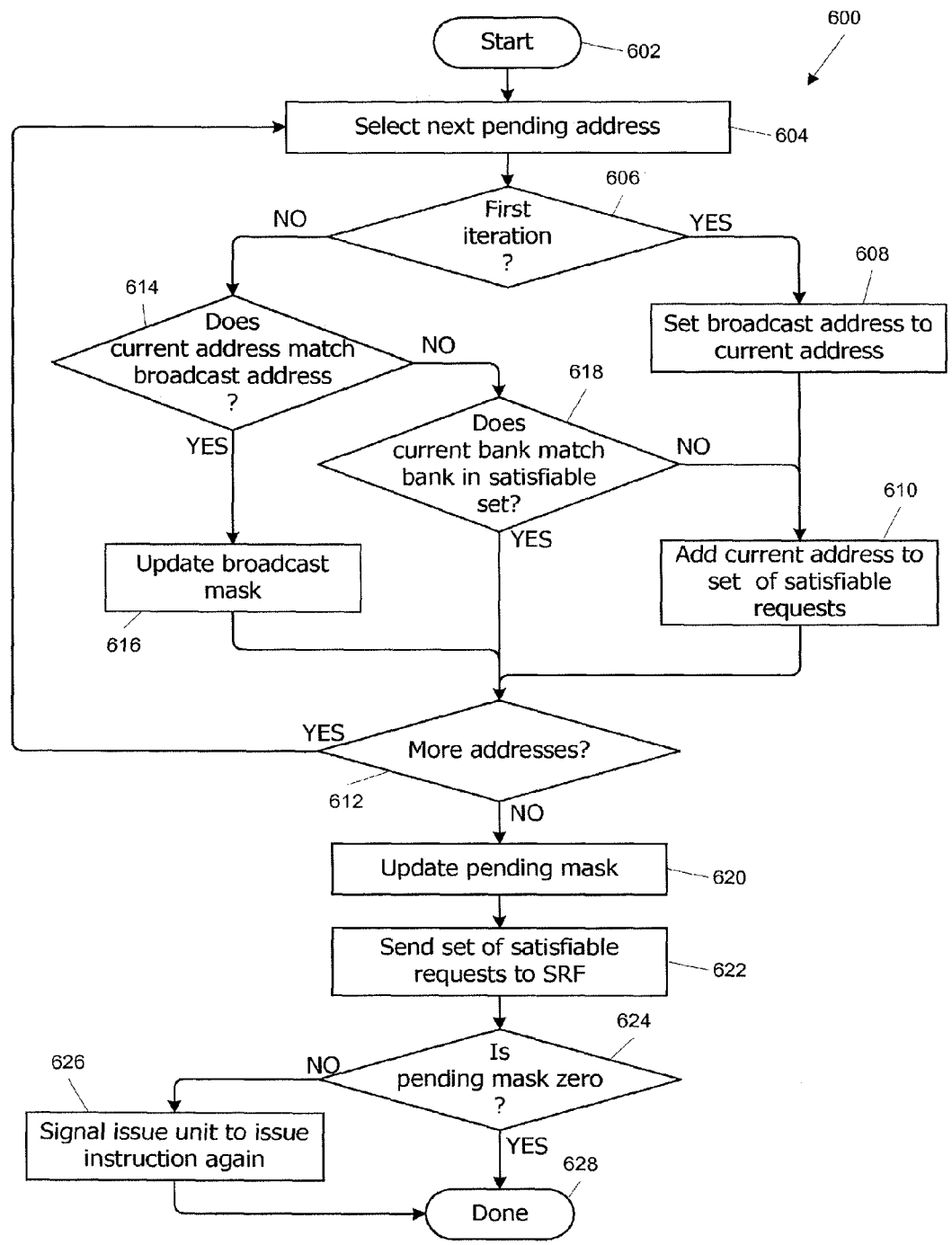
FIG. 6 is a flow diagram of a process for detecting and resolving conflicts among a number of target addresses included in a parallel group of shared memory access requests according to an embodiment of the present invention.

FIG. 6 is a flow diagram of a process 600 for detecting and resolving conflicts among up to P target addresses included in a SIMD group of requests according to an embodiment of the present invention. Process 600, which can be implemented in address conflict logic 310 of FIG. 3, is priority-based. Each processing engine 202 has a unique identifier i (ranging from 0 to P−1) associated therewith. In the event that two (or more) processing engines 202 request access to target addresses in the same bank 302, the processing engine with the lower identifier i is given priority over the processing engine with the higher identifier i; the latter request is "conflicted out" and deferred to a later processing cycle. In addition, to efficiently handle the case where multiple processing engines 202 request read access to the same target address, process 600 also selects one of the target addresses as a "broadcast" address; any requests for the broadcast address from any processing engine 202 are allowed to proceed in parallel. (As described below, data read from one bank 302 can be distributed to any number of processing engines 202.)

More specifically, process 600 starts (step 602) when a group of up to P target addresses is received by address conflict logic 310. The group of target addresses in one embodiment is accompanied by a P-bit "pending" mask that indicates which of the requests have not yet been satisfied; the corresponding target addresses are referred to herein as pending. Process 600 then loops over the pending addresses, beginning at step 604, where the first (highest priority) pending address is read. In this embodiment, pending addresses are considered in order of processing engine identifier i.

At step 606, on the first iteration of the loop, process 600 proceeds to set the broadcast address to the current (i.e., first) pending address at step 608. Process 600 may also define a broadcast mask indicating which of the up to P requests target the broadcast address. Where a broadcast mask is defined, step 608 advantageously includes initializing the mask. At step 610, the broadcast address becomes the first address in a current set of "satisfiable" requests—i.e., requests that will be forwarded to address interconnect 312. At step 612, if the group includes more pending addresses, process 600 returns to step 604 to process the next pending address.

For the second pending address (and any subsequent pending addresses), from step 606, process 600 proceeds to step 614 to determine whether the current pending address matches the broadcast address. If so, then the broadcast mask is updated at step 616 to include the processing engine 202 that provided the current pending address, and process 600 proceeds to step 612.

If, at step 614, the current pending address does not match the broadcast address, then at step 618, it is determined whether the bank for the current pending address matches the bank for any address already in the set of satisfiable requests. In one embodiment, this determination is made by comparing bank field 404 (see FIG. 4) of the current address to the bank field 404 of each address in the satisfiable set. If the bank field of the current address does not match the bank field for any address already in the set, then the current address is added to the satisfiable set at step 610. If the bank field of the current address does match the bank field of the address already in the satisfiable set, then there is a conflict, and the current address cannot be satisfied on this access cycle; process 600 continues with the next address at step 612.

The loop continues until all pending addresses have been processed. Thereafter, at step 620, the pending mask is updated to remove any processing engine 202 for which the target address is in the satisfiable set. The satisfiable set of target addresses is sent to SRF 300 (e.g., via address interconnect 312 of FIG. 3) at step 622.

At step 624, it is determined whether the pending mask is zero. If not, then at step 626, process 600 signals instruction unit 212 of FIG. 2 to issue the access instruction again with the updated pending mask. At step 628, process 600 ends.

Using process 600, at least one pending request will be satisfied in each access cycle, and all requests will be satisfied in the same access cycle to the extent that the addresses of different requests are in different banks Only requests for addresses that are in the same bank as a higher-priority request and that do not match the broadcast address will be deferred. Instruction issue unit 212 reissues the SRF access instruction for any requests that were deferred (in some embodiments, immediately after receiving the updated pending mask), and process 600 executes again with a smaller set of pending addresses. The SRF access instruction can be reissued as many times as necessary, e.g., up to P times, until all requests are satisfied.

It will be appreciated that the conflict management process described herein is illustrative and that variations and modifications are possible. Steps described as sequential may be executed in parallel, order of steps may be varied, and steps may be modified or combined. For instance, the various address comparisons can be performed in parallel rather than in a serial loop. Any processing engine may be designated as highest priority, as all SRF access requests in the group will be satisfied before the next instruction for the group is issued. Process 600 can be implemented using suitably-configured hardware, software, or any combination thereof.

Some hardware-based implementations of process 600 effectively unroll the loop using an array of parallel comparators to perform pairwise comparisons of the bank bits of all pending addresses and to compare each address to the broadcast address. Given a sufficient number of comparators, all of the address comparisons can be performed in a single clock cycle, supporting low-latency access to SRF 300. An example of one such hardware-based implementation will now be described.

Figure 7:
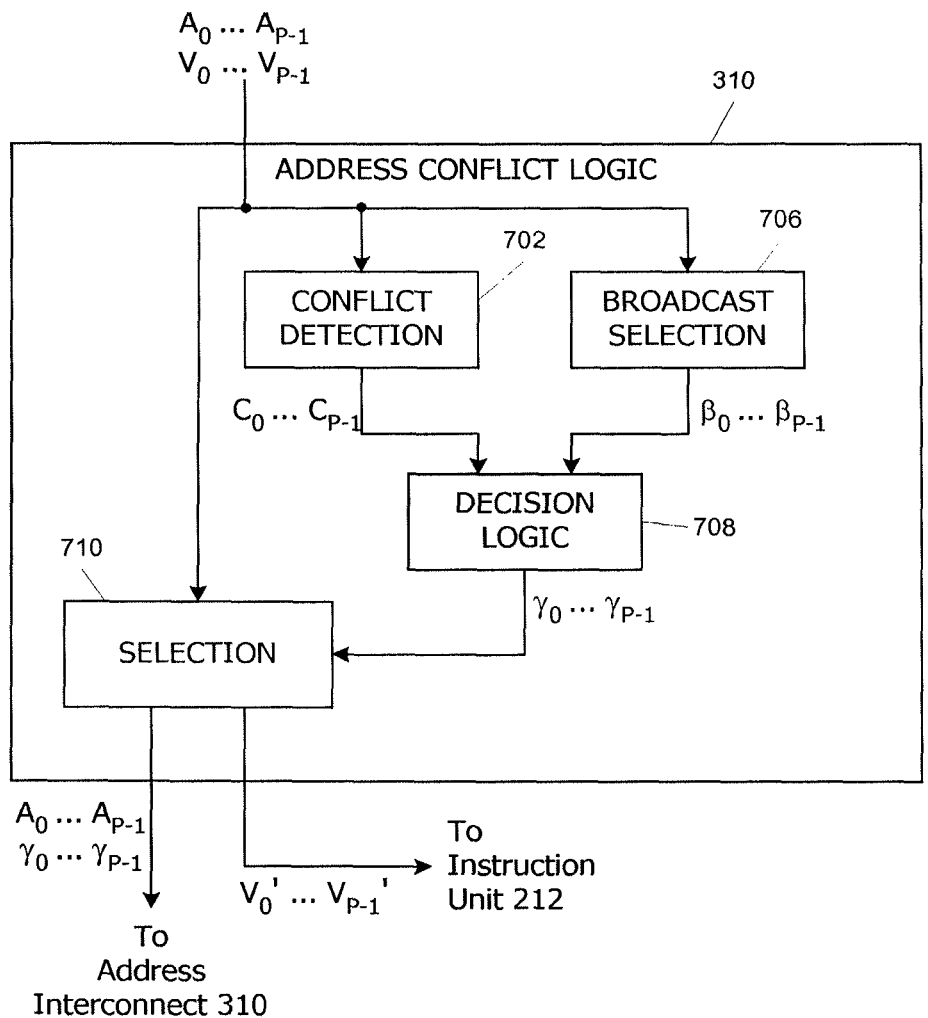
FIG. 7 is a block diagram of an address conflict logic subsystem according to an embodiment of the present invention.

FIG. 7 is a block diagram of address conflict logic 310 according to an embodiment of the present invention. In this embodiment, address conflict logic 310 includes a conflict detection unit 702, a broadcast selection unit 706, decision logic 708 and a final selection unit 710. Address conflict logic 310 receives a group of P addresses ($A_0 \ldots A_{P-1}$), one from each processing engine 202 and a P-bit pending (valid) mask ($V_0 \ldots V_{P-1}$) indicating which of the requests in the group are pending. In this embodiment, a bit $V_i$ is asserted (set to a logical true state) if the request from processing engine 202($i$) is pending and deasserted (set to a logical false state) otherwise.

In operation, conflict detection unit 702 compares the bank bits 404 (see FIG. 4) of the pending addresses ($A_0 \ldots A_{P-1}$) to detect bank conflicts and produces P one-bit conflict signals $C_0 \ldots C_{P-1}$. A conflict signal $C_i$ is asserted if the corresponding address $A_i$ conflicts with a pending address having higher priority (i.e., an address $A_j$ for which j<i and pending bit $V_j$ is logic high) and deasserted otherwise. In parallel, broadcast selection unit 706 selects the pending address $A_i$ with the lowest identifier i as a broadcast address and generates broadcast signals $\beta_0 \ldots \beta_{P-1}$. A broadcast signal $\beta_i$ is asserted if the address $A_i$ is pending and matches the broadcast address and deasserted otherwise.

Decision logic 708 receives the $C_i$ and $\beta_i$ signals and determines which requests are satisfiable. Decision logic 708 generates a set of go signals $\gamma_0 \ldots \gamma_{P-1}$. A go signal $\beta_i$ is asserted if the address $A_i$ is pending ($V_i$ is asserted) and either there are no conflicts ($C_i$ is deasserted) or address $A_i$ is the broadcast address ($\beta_i$ is deasserted). Otherwise, $\gamma_i$ is deasserted.

Selection unit 710 updates the pending mask $V_0 \ldots V_{P-1}$ using the go signals $\gamma_i$ and sends the updated pending mask $V_0' \ldots V_{P-1}'$ to instruction unit 212 (FIG. 2). Selection unit 710 also sends the addresses $A_i$ whose go signals $\gamma_i$ are asserted to address interconnect 310.

Figure 8:
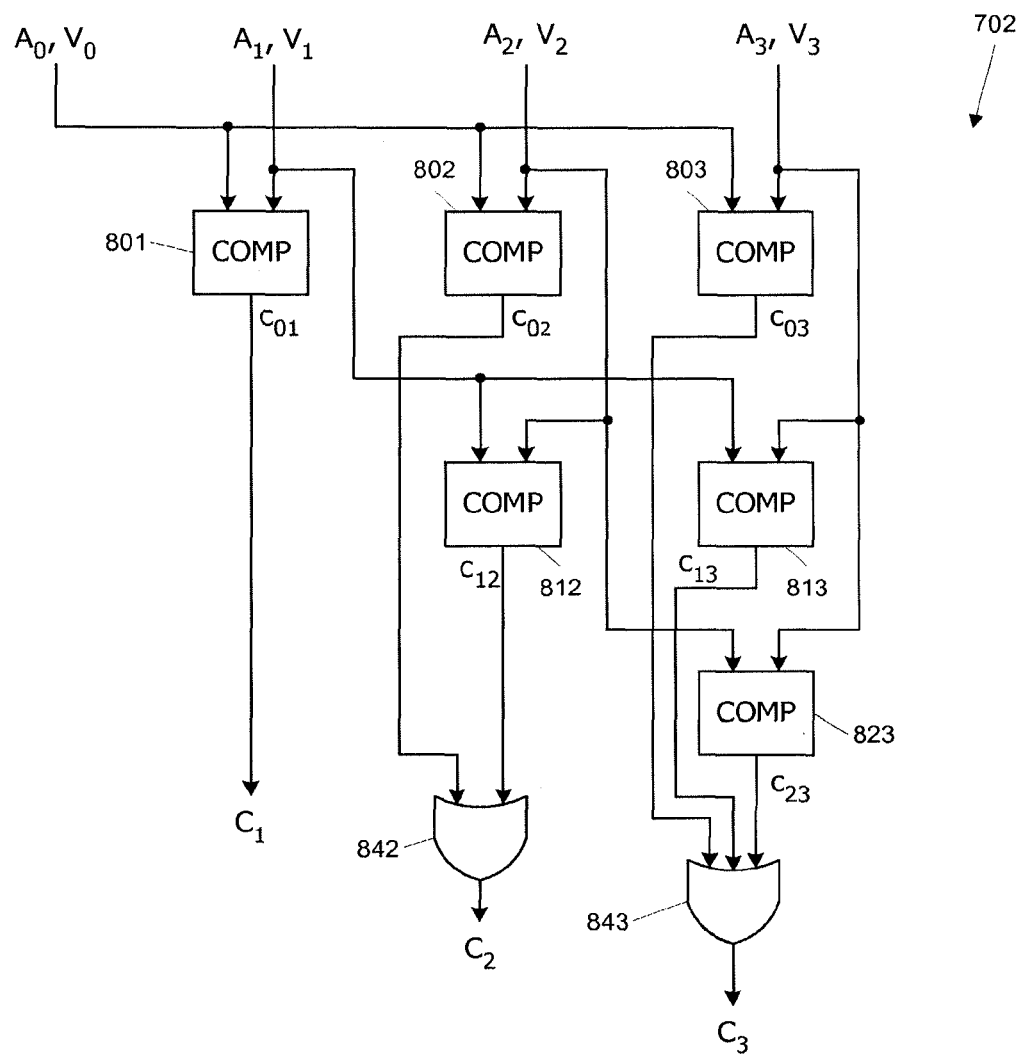
FIG. 8 is a block diagram of a conflict detection unit for the address conflict logic subsystem of FIG. 7 according to an embodiment of the present invention.

FIG. 8 is a block diagram of conflict detection unit 702 of FIG. 7 according to an embodiment of the present invention. In this embodiment, the number P of processing engines is 4; it is to be understood that conflict detection unit 702 could be modified for use with any number of processing engines. In this embodiment, address $A_0$ has highest priority; if pending-mask bit $V_0$ is asserted, the request for address $A_0$ will be allowed to proceed. Thus, a $C_0$ conflict signal need not be explicitly generated; in some embodiments, the $C_0$ signal can be always deasserted.

Conflict detection module 702 includes six comparison (COMP) circuits 801-803, 812, 813 and 823. Each comparison circuit 801-803, 812, 813 and 823 compares the bank bits (e.g., bank field 404 of address 400 of FIG. 4) of its two input addresses $A_i$, $A_j$ and produces an output bit $c_{ij}$ that is asserted if the bank bits of the two addresses match and deasserted otherwise. In some embodiments, each comparison circuit 801-803, 812, 813 and 823 also includes status checking logic that receives the pending-mask bits $V_i$, $V_j$ corresponding to its input addresses; unless both addresses are pending, the output bit $c_{ij}$ is advantageously deasserted. It should be noted that comparison circuits 801-803, 812, 813 and 823 can all operate in parallel to produce the complete set of $c_{ij}$ signals and that each comparison circuit need only compare $\log_2$ B bits.

A conflict signal $C_i$ for each address $A_i$ is generated as a logical OR of the output bits $c_{ji}$ from comparisons of address $A_i$ to each address $A_j$ for which j<i. Thus, the conflict signal $C_1$ is just the output bit $c_{01}$ of comparison circuit 801. An OR gate 842 forms conflict signal $C_2$ as the logical OR of the respective output bits $c_{02}$ and $c_{12}$ of comparison circuits 802 and 812. An OR gate 843 forms conflict signal $C_3$ as the logical OR of the respective output bits $c_{03}$, $c_{13}$, and $c_{23}$ of comparators 803, 813 and 823. In other words, assuming addresses $A_0$-$A_3$ are all pending, conflict signal $C_1$ is asserted if address $A_1$ is in the same bank as address $A_0$; conflict signal $C_2$ is asserted if address $A_2$ is in the same bank as either address $A_1$ or address $A_0$; and conflict signal $C_3$ is asserted if address $A_3$ is in the same bank as any of addresses $A_2$, $A_1$ or $A_0$. The conflict signals $C_i$ are delivered to decision logic 708 as shown in FIG. 7.

Figure 9:
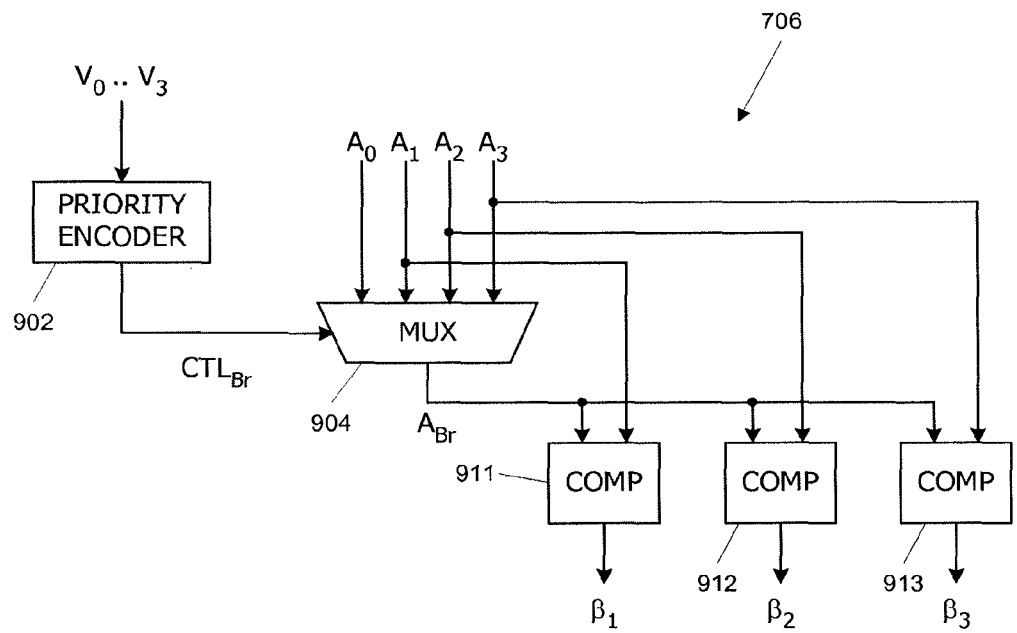
FIG. 9 is a block diagram of a broadcast selection unit for the address conflict logic subsystem of FIG. 7 according to an embodiment of the present invention.

FIG. 9 is a block diagram of broadcast selection unit 706 of FIG. 7 according to an embodiment of the present invention. In this embodiment, the number P of processing engines is 4; those skilled in the art will appreciate that broadcast selection unit 706 can be modified for use with any number of parallel requests. Broadcast selection unit 706 includes a priority encoder 902, a selection multiplexer 904, and comparison circuits 911, 912, 913. Priority encoder 902 receives the pending mask $V_0 \ldots V_3$ and identifies the position of the leading asserted bit (in this embodiment, $V_0$ is the leading bit). Selection multiplexer 904 receives the target addresses $A_0 \ldots A_3$.

Priority encoder 902 generates a control signal ($CTL_{Br}$) that directs selection multiplexer 904 to select the address $A_i$ corresponding to the leading asserted bit $V_i$ as a broadcast address $A_{Br}$. The broadcast address $A_{Br}$ is delivered to comparison circuits 911, 912, 913. Each comparison circuit also receives a different one of the addresses $A_i$ as shown. Comparison circuits 911-913 each compare the input address $A_i$ to the broadcast address $A_{Br}$. A broadcast signal $\beta_i$ is asserted if the addresses $A_i$ and $A_{Br}$ match and deasserted otherwise. Comparison circuits 911-913, unlike comparison circuits 801-803, 812, 813 and 823 of FIG. 8, compare the full addresses (e.g., at least row field 406 and bank field 404 of address 400 of FIG. 4), not just the bank bits. In some embodiments, comparison circuits 911 also include pending-bit checking logic that receives the pending-mask bit $V_i$ corresponding to its input address; if the input address $A_i$ is inactive, then the broadcast bit $\beta_i$ is advantageously deasserted. The signals $\beta_i$ are sent to decision logic 708 as shown in FIG. 7.

It should be noted that in this embodiment, broadcast selection unit 706 does not include a comparison circuit for address $A_0$. Such a circuit is not needed because in this embodiment, address $A_0$ is always the highest priority address; if the request for address $A_0$ is pending, $A_0$ will be selected as the broadcast address. In one embodiment, broadcast signal $\beta_0$ is just the pending mask bit $V_0$; in another embodiment, an explicit $\beta_0$ signal is not used.

Figure 10:
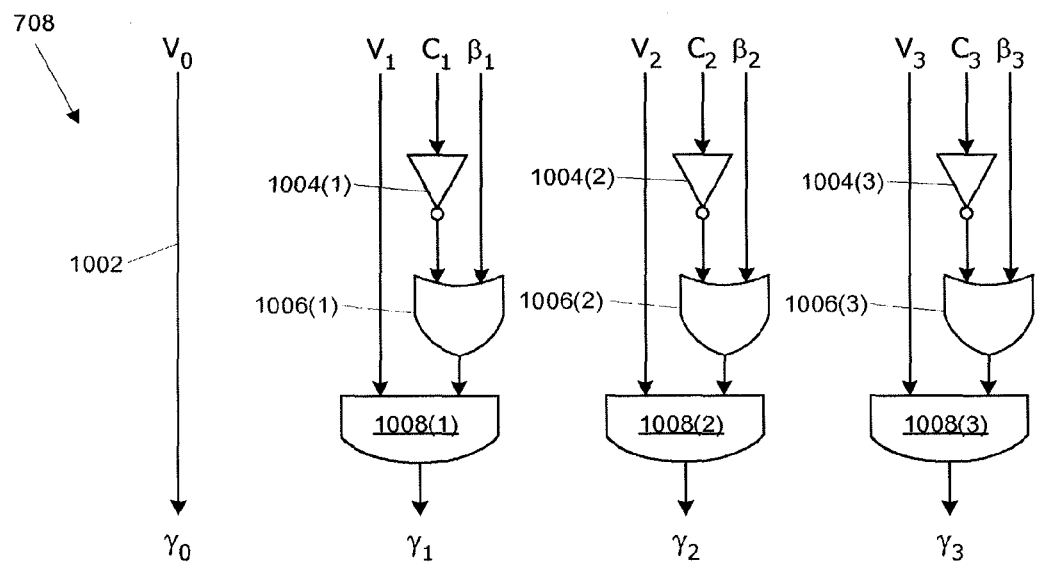
FIG. 10 is a block diagram of a decision logic unit for the address conflict logic subsystem of FIG. 7 according to an embodiment of the present invention.

FIG. 10 is a block diagram of decision logic 708 according to an embodiment of the present invention. In this embodiment, the number P of processing engines is 4; it is to be understood that the logic described herein can be modified for use with any number of processing engines. Decision logic 708 receives the pending mask $V_0 \ldots V_3$, the conflict signals $C_1 \ldots C_3$, and the broadcast signals $\beta_1 \ldots \beta_3$ and generates the go signals $\gamma_0 \ldots \gamma_3$. The go signal for the request from processing engine 202(i) is asserted if the request is satisfiable this cycle and deasserted otherwise. In this embodiment, the request targeting address $A_0$ has highest priority: if pending bit $V_0$ is asserted, then the request targeting $A_0$ is satisfiable. Accordingly, signal path 1002 sets $\gamma_0$ to match the (asserted or deasserted) state of $V_0$. Requests from processing engines 202(1), 202(2) and 202(3) are satisfiable if there is no conflict (i.e., if $C_i$ is deasserted) or if the address $A_i$ matches the broadcast address (i.e., if $\beta_i$ is asserted). Inverters 1004(i) invert the $C_i$ signals (producing signals $\overline{C_i}$), and OR gates 1006(i) determine the Boolean function ($\overline{C_i}$ OR $\beta_i$). The go signal $\gamma_i$ is asserted only if the request is pending; accordingly AND gates 1008 are used to generate the final go signals. Thus, for i>0, $\gamma_i = (\overline{C_i}$ OR $\beta_i)$ AND $V_i$.

Referring again to FIG. 7, decision logic 708 provides the go signals $\gamma_i$ to selection logic 710. Selection logic 710 transmits the address(es) $A_i$ for which the corresponding go signal $\gamma_i$ is asserted to address interconnect 312 for delivery to SRF 300 (FIG. 3). In some embodiments, all addresses $A_i$ are transmitted, along with the go signals $\gamma_i$, and address interconnect 312 ignores any address $A_i$ for which the go/no-go signal $\gamma_i$ is not asserted. Selection logic 710 also updates the pending mask $V_0 \ldots V_{P-1}$, e.g., by implementing the logic:

$V_i' = V_i$ AND $\overline{\gamma_i}$.

That is, any request that was pending and not satisfiable on the current cycle remains pending; any request that was pending and satisfiable on this cycle ceases to be pending. In some embodiments, the updated pending mask $V_0' \ldots V_{P-1}'$ is delivered to instruction unit 212 (FIG. 2); if the pending mask includes at least one asserted bit, then instruction unit 212 issues the SRF access instruction again (with the new pending mask) before proceeding to the next instruction for the thread group.

It will be appreciated that the address conflict logic described herein is illustrative and that variations and modifications are possible. The logic circuits and other components described herein can be implemented using conventional integrated circuit or other techniques. In some embodiments where byte addressing is used, the conflict logic may be modified to detect instances in which two or more of the target addresses correspond to different bytes within the same entry (e.g., word) and to treat such requests as non-conflicting. For example, the entire word could be delivered to each requesting processing engine regardless of which byte (or bytes) was requested by a particular processing engine, and each processing engine could extract the desired portion of the word.

It should also be noted that the logic described herein may be modified for use with any number P of parallel processing engines. For instance, conflict detection logic 702 can be modified to include P(P-1)/2 parallel comparison circuits, each of which advantageously compares only the $\log_2$ B bank bits of the input addresses. In one embodiment, P=B=16, and conflict detection logic 702 includes 120 4-bit comparison circuits. Similarly, broadcast selection logic 704 can be modified to include P-1 parallel comparison circuits operating on the full addresses of the inputs (e.g., a 12-bit word address).

In embodiments where the number P of parallel requests exceeds the number B of banks 302 in SRF 300, every set of P parallel requests will generate at least one conflict. In the case where all P requests target the same address, the broadcast logic described above would still allow all P requests to be handled in a single access cycle. In embodiments where B is at least as large as P, it is possible for all P requests to be handled in a single access cycle as long as all requests target either the broadcast address or addresses in different banks from any other address. Thus, embodiments where B≥P can provide certain advantages in processing efficiency and overall throughput. (Suitable code optimizations can further reduce the occurrence of conflicts for at least some programs; such optimizations are not critical to the present invention.)

The time required to process a single access request using address conflict logic 310 is generally proportional to the largest number of requests that target different addresses in a single bank, which determines the number of times the SRF access instruction is issued. In some embodiments, a "multicast" mode with two or more broadcast addresses, each associated with a different subset of the requests, is provided. A multicast mode can be implemented, e.g., by using multiple copies of the broadcast logic described above, along with additional circuitry to ensure that the two (or more) multicast addresses are in different banks from each other. The extent to which different processing engines issue parallel requests that target the same address depends on the particular application, and thus any further advantage gained by implementing a multicast mode would be application-dependent.

In still other embodiments, the broadcast logic can be omitted entirely. To the extent that processing engines issue parallel requests targeting the same address, efficiency may be reduced, but acceptable performance can still be obtained.

The address conflict logic described herein can be used for both read and write requests. In the case of a write request, any broadcast (or multicast) logic is advantageously disabled to prevent two different processing engines from attempting to write to the same location at the same time. It should be noted that a SIMD group of write requests can include multiple requests targeting the same address. In the embodiment described above, the request with the highest processing engine identifier i would be satisfied last; consequently, after execution of the write instruction, a multiply-targeted location would predictably contain the data written in response to that request. Those skilled in the art will appreciate that other rules for serializing access in the event of a conflict, including other priority rankings, could also be implemented. Accordingly, to the extent that the programmer does not know the applicable serialization rule or control the assignment of threads to processing engines, the programmer advantageously does not rely on this aspect of system behavior in designing code. Further, in instances where SRF 300 is shared by threads of multiple SIMD groups (e.g., in the case of a CTA with more than P threads), the order in which threads in different SIMD groups execute a write instruction may also be out of the programmer's control, and the programmer advantageously designs program code such that multiple writes to the same address do not occur in parallel.

In some embodiments, the instruction issue unit 212 of core 210 advantageously issues the SRF access instruction repeatedly until all requests have been satisfied before going on to the next instruction for the SIMD group. Instructions from other SIMD groups might or might not be interleaved with repeated SRF access instructions, depending on implementation. In such embodiments, execution of an SRF access instruction is implicitly synchronized across a SIMD group. For instance, if the threads of a SIMD group each write data to SRF 300, then read data from SRF 300 that was written by another thread in the same group, there is no need for explicit synchronization, as all writes for the group would complete before any reads are issued, and consequently each thread will read the correct data. Across different SIMD groups, however, this behavior is not guaranteed, and explicit synchronization instructions in the program code (e.g., as described in above-referenced application Ser. No. 11/305, 178) are advantageously used as needed to maintain coherence of shared data.

Access to Shared Constants

In still other embodiments, all or part of the address conflict logic described herein can also be used to facilitate access to "constants" stored in a shared memory. Such constants may include, e.g., various rendering parameters that change relatively rarely. If sufficient storage were provided, each thread could have its own copy of the constants; however, to the extent that the constants remain constant over a large number of threads, the stored data would include significant duplication Accordingly, in some embodiments of the present invention, each constant is stored in an on-chip shared memory, referred to herein as a "constants memory," that may be separate from the shared memory 206 (e.g., SRF 300) described above. The constants memory has some number of storage locations, and all storage locations are advantageously accessible to all processing engines 202.

In one embodiment, a constants memory is implemented in all or part of parameter memory 208 of FIG. 2. In this embodiment, when a constant is updated (e.g., via a graphics driver command as is known in the art), the new value is loaded into parameter memory 208 by core interface 203. Processing engines 202 read constants from parameter memory 208 but do not write to it. For example, a command load.constant $R_D$, C[index]

instructs the processing engines 202 to read the value at address C[index] from parameter memory 208 into a destination register $R_D$ in local register file 204 (FIG. 2). In some embodiments, the constants memory is implemented as a shared cache memory using associative tag lookup rather than direct addressing; it is to be understood that "constants memory" as used herein includes cache memory as well as directly addressed memory.

As with the shared memory described above, the index (or address) to be accessed can be independently determined for each thread; consequently, access requests to parameter memory 208 by the P threads within a SIMD group may target the same address or different addresses. For instance, different threads might request different constants, or different threads might request different versions of the same constant. In one embodiment, constants are provided as an array, and threads use an index to specify the address of the constant to be read. In another embodiment, multiple versions of the array of constants are maintained, e.g., in different regions within parameter memory 208, and each thread is provided with a version identifier specifying which version of the constants that thread should use. In this embodiment, a thread can specify an address, e.g., by concatenating the index of a particular constant to the thread's version identifier.

Figure 11:
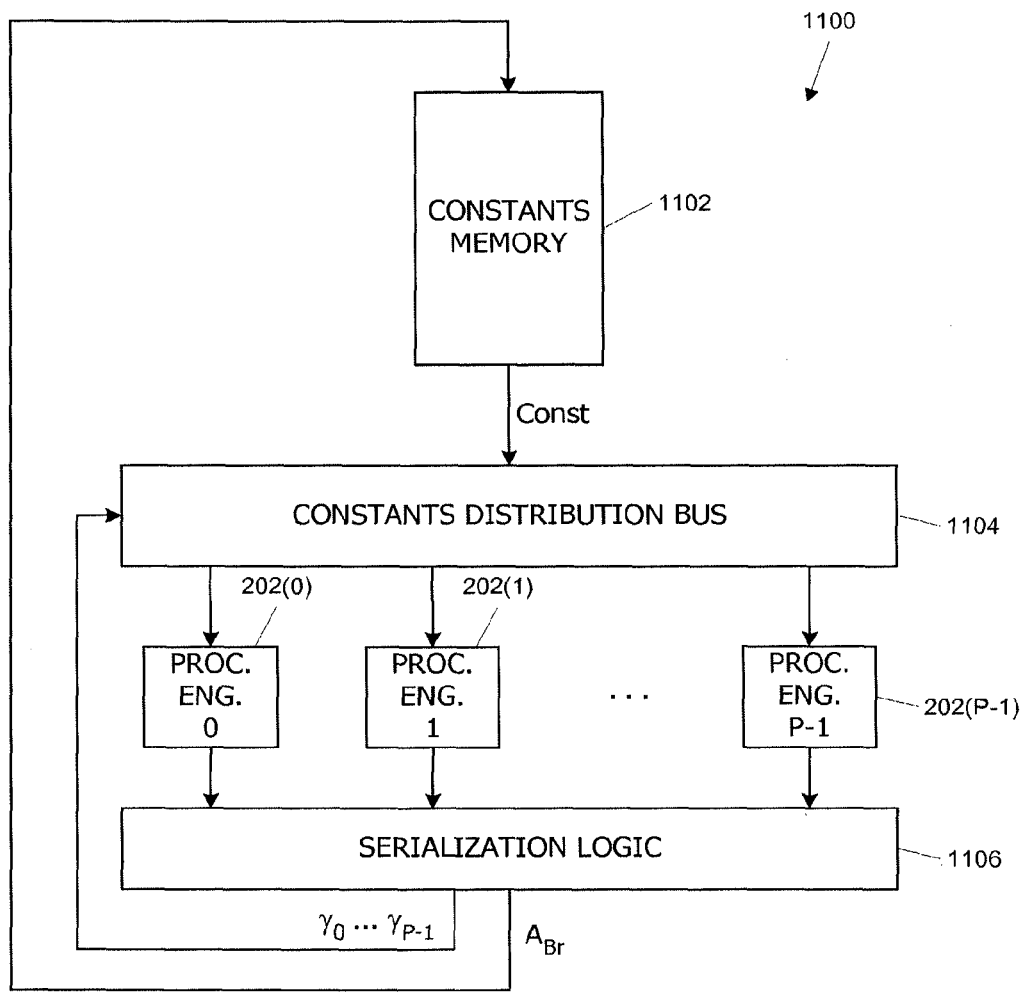
FIG. 11 is a block diagram of a constants memory subsystem according to an embodiment of the present invention.

FIG. 11 is a block diagram of a constants memory subsystem 1100 showing connections between a constants memory 1102 and processing engines 202 according to an embodiment of the present invention. In this embodiment, constants memory 1102, which can be implemented, e.g., using SRAM, DRAM, registers or the like, has a single bank. During each read access cycle, one address is provided to constants memory 1102, and the data stored at that address is accessed and delivered to a constants distribution bus 1104, which can deliver the data to one or more (or all) of processing engines 202.

As noted above, processing engines 202 generate up to P requests for constants in parallel, and the requests may target the same address or different addresses in constants memory 1102. Serialization logic 1106 is advantageously configured to select a target address each cycle and forward the selected address to constants memory 1102. When the selected address is accessed, the data from that address is broadcast via constants distribution bus 1104 to all processing engines 202 whose requests targeted that address. Thus, a group of P requests can be satisfied by accessing each different address in the group exactly once.

Figure 12:
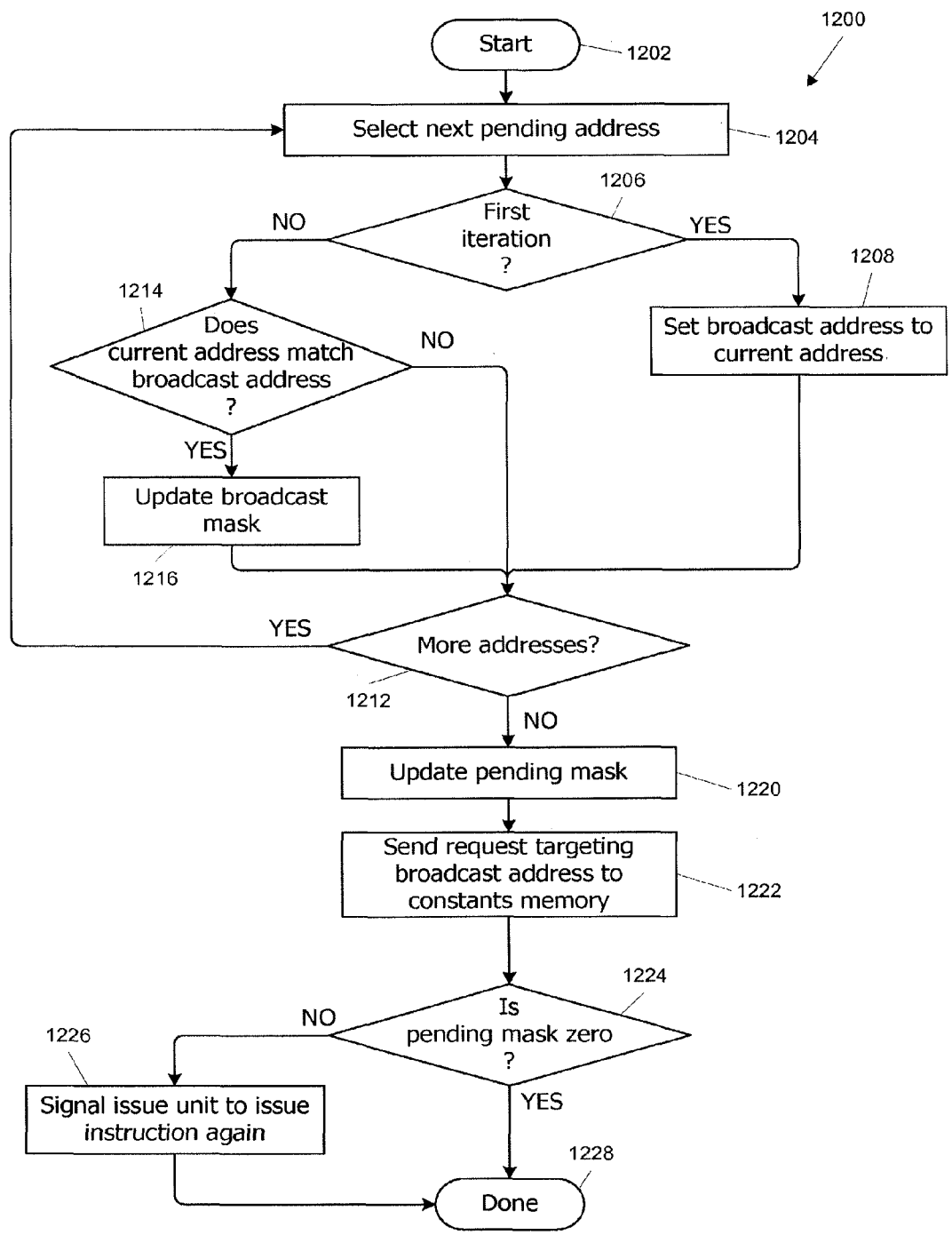
FIG. 12 is a flow diagram of a process for selecting one address per cycle from among a parallel group of constants memory access requests according to an embodiment of the present invention.

FIG. 12 is a flow diagram of a process 1200 for selecting one address per cycle from up to P target addresses included in a SIMD group of requests targeting constants memory 1102 according to an embodiment of the present invention. Process 1200, which can be implemented in serialization logic 1106 of FIG. 11, is priority-based. Each processing engine 202 has a unique identifier i (ranging from 0 to P−1) associated therewith. The address requested by the processing engine 202 with the lowest identifier i for which a request is pending is given priority. Any requests that target the same address as the highest-priority pending request are also allowed to proceed; any requests targeting a different address in constants memory 1102 are conflicted out and deferred to a later processing cycle. The logic can be generally similar to the broadcast logic portion of process 600 of FIG. 6 described above.

More specifically, process 1200 starts (step 1202) when a group of up to P target addresses ($A_0 \ldots A_{P-1}$), which can be indices into constants memory 1102, is received by serialization logic 1106. The group of target addresses in one embodiment is accompanied by a P-bit "pending" (valid) mask ($V_0 \ldots V_{P-1}$) that indicates which of the requests have not yet been satisfied; the corresponding target addresses are referred to herein as pending. Process 1200 then loops over the pending addresses, beginning at step 1204, where the first (highest priority) pending address is read. In this embodiment, pending addresses are considered in order of processing engine identifier i.

At step 1206, on the first iteration of the loop, process 1200 proceeds to set the broadcast address to the current (i.e., first) pending address at step 1208. Process 1200 may also define a broadcast mask indicating which of the up to P requests target the broadcast address. Where a broadcast mask is defined, step 1208 advantageously includes initializing the mask. At step 1212, if the group includes more pending addresses, process 1200 returns to step 1204 to process the next pending address. (In this case, unlike process 600, the broadcast address will be the only address delivered to constants memory 1102; accordingly, a list of satisfiable requests is not maintained, apart from the broadcast mask.)

For the second pending address (and any subsequent pending addresses), from step 1206, process 1200 proceeds to step 1214 to determine whether the current pending address matches the broadcast address. If so, then the broadcast mask is updated at step 1216 to include the processing engine 202 that provided the current pending address. If not, then the request cannot be satisfied this cycle, and the broadcast mask is not updated. In either case, process 1200 continues to loop over addresses (step 1212) until all pending addresses have been considered.

Thereafter, at step 1220, the pending mask is updated to remove any processing engine 202 for which the target address is the broadcast address. A request targeting the broadcast address is sent to constants memory 1102 at step 1222.

At step 1224, it is determined whether the pending mask is zero. If not, then at step 1226, process 1200 signals instruction unit 212 of FIG. 2 to issue the access instruction again with the updated pending mask. At step 1228, process 1200 ends.

Using process 1200, at least one pending request will be satisfied in each access cycle, and all requests will be satisfied in the same access cycle to the extent that they all target the same address. Only requests for different addresses will be deferred. Instruction issue unit 212 reissues the SRF access instruction for any requests that were deferred (in some embodiments, immediately after receiving the updated pending mask), and process 1200 executes again with a smaller set of pending addresses. The constants-memory access instruction can be reissued as many times as necessary, e.g., up to P times, until all requests are satisfied.

It will be appreciated that the serialization process described herein is illustrative and that variations and modifications are possible. Steps described as sequential may be executed in parallel, order of steps may be varied, and steps may be modified or combined. For instance, the various address comparisons can be performed in parallel rather than in a serial loop. Any processing engine may be designated as highest priority, as all access requests in the group will be satisfied before the next instruction for the group is issued. Process 1200 can be implemented using suitably-configured hardware, software, or any combination thereof.

As with process 600 described above, some hardware-based implementations of process 1200 effectively unroll the loop using an array of parallel comparators to compare each address to the broadcast address. Given a sufficient number of comparators, all of the address comparisons can be performed in a single clock cycle, supporting low-latency access to constants memory 1102. An example of one such hardware-based implementation will now be described.

Figure 13:
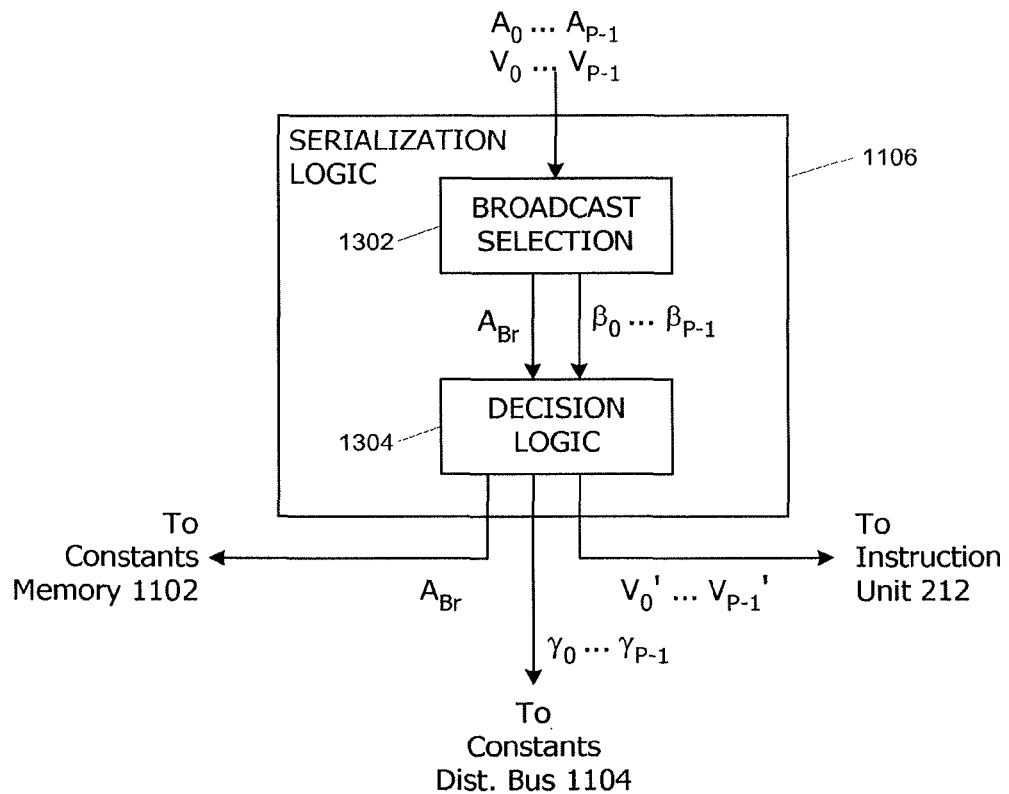
FIG. 13 is a block diagram of serialization logic according to an embodiment of the present invention.

FIG. 13 is a block diagram of serialization logic 1106 according to an embodiment of the present invention. Serialization logic 1106 is somewhat similar to address conflict logic 310 of FIG. 3, except that the memory to be accessed in this case has a single bank and accordingly there is no need for separate bank-conflict detection logic. In this embodiment, serialization logic 1106 includes a broadcast selection unit 1302 and decision logic 1304. Serialization logic 1106 receives a group of P addresses ($A_0 \ldots A_{P-1}$), one from each processing engine 202, and a P-bit pending mask ($V_0 \ldots V_{P-1}$) indicating which of the requests in the group are pending. In this embodiment, a bit $V_i$ in the pending mask is asserted if the request from processing engine 202($i$) is pending and deasserted otherwise.

In operation, broadcast selection unit 1302 selects the pending address $A_i$ with the lowest associated identifier i as a broadcast address ($A_{Br}$) and generates broadcast signals $\beta_0 \ldots \beta_{P-1}$. A broadcast signal $\beta_i$ is asserted if the address $A_i$ is pending (valid) and matches the broadcast address and deasserted otherwise. Implementation of broadcast selection unit 1302 can be identical to the implementation of broadcast selection unit 706 described above with reference to FIG. 9. In some embodiments, the same circuits are used to perform broadcast selection operations for shared memory access and for constants memory access; in other embodiments, two copies of the broadcast selection logic circuits are provided, allowing shared memory access requests and constants memory access requests to be processed in parallel.

Decision logic 1304 receives the $\beta_i$ signals and determines which requests are satisfiable. Decision logic 1304 generates a set of go signals $\gamma_0 \ldots \gamma_{P-1}$. A go signal $\gamma_i$ is asserted if the address $A_i$ is pending ($V_i$ is asserted) and matches the broadcast address ($\beta_i$ is asserted). Otherwise, $\gamma_i$ is deasserted. Decision logic 1304 also updates the pending mask $V_0 \ldots V_{P-1}$ using the go signals $\gamma_i$ and sends the updated pending mask $V_0' \ldots V_{P-1}'$ to instruction unit 212 (FIG. 2). The broadcast address $A_{Br}$ is sent to constants memory 1102, and the go signals $\gamma_i$ are advantageously sent to constants distribution bus 1104 (FIG. 11).

Figure 14:
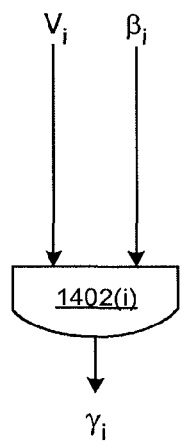
FIG. 14 illustrates a portion of the decision logic for the serialization logic of FIG. 7 according to an embodiment of the present invention.

FIG. 14 illustrates a portion of the decision logic 1304 for each processing engine identifier i according to an embodiment of the present invention. Since bank conflicts are not considered, the decision logic is simpler than decision logic 708 shown in FIG. 10. In this example, decision logic 1304 includes an AND gate 1402($i$) for each processing engine identifier i, implementing the logic:

$$\gamma_i = \beta_i \text{ AND } V_i.$$

Referring again to FIG. 11, the selected (broadcast) address $A_{Br}$ is delivered to constants memory 1102 while the go signals $\gamma_i$ are delivered to constants distribution bus 1104. Constants memory 1102 accesses the data (Const) at the broadcast address $A_{Br}$ and delivers it to constants distribution bus 1104.

Figure 15:
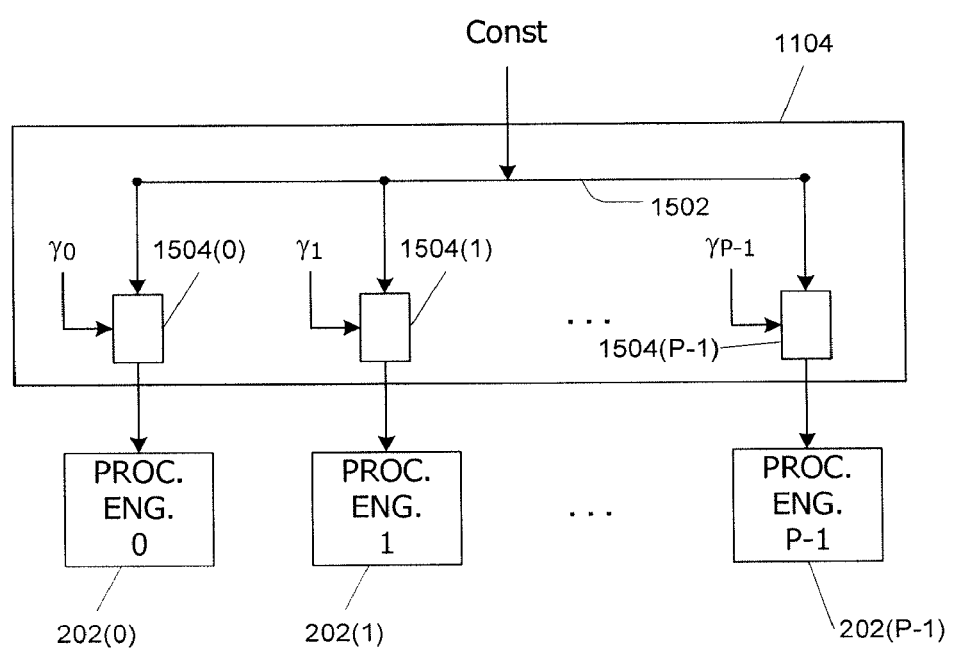
FIG. 15 is a block diagram of a constants distribution bus according to an embodiment of the present invention.

FIG. 15 is a block diagram showing constants distribution bus 1104 according to an embodiment of the present invention. Constants distribution bus 1104 includes a distribution path 1502 for a constant Const and a number of switchable coupling circuits 1504 equal to the number P of processing engines 202. Each coupling circuit 1504 couples distribution path 1502 to a respective processing engine 202. The coupling is controlled by the go signals $\gamma_i$ such that a given processing engine 202($i$) receives the constant Const only if the go signal $\gamma_i$ for that processing engine 202($i$) is asserted.

It should be noted that in the embodiment described herein, if all processing engines 202 request the same address in constants memory 1102, all of the requests can be satisfied with a single access operation. Serialization occurs to the minimum extent necessary; for each SIMD group of requests, a given address will be accessed only once, and all of the processing engines 202 that targeted that address will receive the data as a result of that one access. Thus, to the extent that a SIMD group references only two different constant addresses, requests will be satisfied with two access operations. Only in the case where all P requests target different addresses (which is relatively rare for rendering constants) will as many as P serialized accesses be required. Those skilled in the art with access to the present teachings will recognize that this approach can be significantly more memory efficient than storing constants on a per-thread or per-group basis without incurring a significant penalty in terms of processing time.

It will be appreciated that the constants serialization logic described herein is illustrative and that variations and modifications are possible. The serialization logic can be implemented regardless of whether a shared memory as described above is also present (and vice versa). As noted previously, the same broadcast logic circuit could be used for controlling access to both shared memory and conflicts memory, although in that case, only one type of request could be handled at a time; in other embodiments, separate copies of the broadcast logic circuit are provided to allow parallel handling of both types of requests.

Further, while the constants memory has been described with reference to rendering constants, other types of data could also be stored in a constants memory. For example, in one embodiment, matrix multiplication is implemented using a CTA. As is well known, in matrix multiplication, a m×p matrix X and a p×n matrix Y can be multiplied to create a p×r matrix U. The elements $u_{ij}$ of matrix U are given by:

$$u_{ij} = \sum_{k=1}^{n} x_{ik} y_{kj},$$

where $x_{ik}$ and $y_{kj}$ are elements of the matrices X and Y, respectively.

In one embodiment, each thread of a CTA is responsible for computing one element $u_{ij}$ of the product matrix U. The elements $y_{kj}$ of matrix Y can be loaded into constants memory 1102 of FIG. 11 while the elements $x_{ik}$ of matrix X are loaded into SRF 300 of FIG. 3 (or other shared memory implementation). The threads operate by looping over dummy index k; at each iteration, the appropriate pair of matrix elements $x_{ik}$ and $y_{kj}$ are retrieved from memory, multiplied and accumulated with previous iterations. Each thread can accumulate its results in a local register, then write the final result to shared memory or to off-chip memory as desired.

With appropriate assignments of thread identifiers, the P threads of one SIMD group correspond to the same column index j but different row indices i. Thus, on each loop iteration the P threads will request the same $y_{kj}$ (the same row k and column j) in parallel and will also request P different $x_{ik}$ (different rows i but same column k). Since all threads request the same $y_{kj}$, the value can be provided from constants memory 1102 to all threads in the group in a single access cycle. If the $x_{ik}$ values for the P rows i included in the SIMD group are all in different banks in SRF 300, the P requested $x_{ik}$ values can also be supplied in a single access cycle. If the requests for $x_{ik}$ and $y_{kj}$ can be handled in parallel, the matrix multiplication can be performed with very low memory overhead.

It should be noted that the matrix multiplication operation is presented herein solely to illustrate that shared memory and constants memory can be used together during a general-purpose computation. Other implementations of matrix multiplication using CTAs are possible; for instance, each thread might compute more than one element of the product matrix, e.g., using multiple local registers to accumulate results for different matrix elements. In addition, other operations can also be implemented using a shared memory and/or a constants memory as desired.

Further Embodiments

While the invention has been described with respect to specific embodiments, one skilled in the art will recognize that numerous modifications are possible. For instance, while the descriptions above may make reference to specific hardware or software components, it will be appreciated that the various logic operations could be implemented using any combination of hardware and/or software.

As noted above, embodiments where the number B of banks in the shared memory is at least as large as the number P of parallel processing engines provide increased likelihood that a group of parallel memory requests can be satisfied in parallel. The present invention, however, is not limited to such embodiments, and B may be greater than, equal to, or less than P as desired; access to shared memory can be serialized to the extent needed in any given case.

A shared memory and/or a constants memory in accordance with the present invention can be implemented using a variety of memory technologies, including but not limited to conventional technologies such as SRAM (static random access memory), DRAM (dynamic random access memory), cache structures, and the like. In some embodiments, a shared register file and a local register file are both implemented using SRAM, and the SRF and LRF can be in different sections of the same SRAM. Where this is the case, lanes in the LRF might also be independently addressable; however, SIMD instruction issue generally has the property that corresponding locations in the LRF lanes are accessed in parallel, so independently-addressable LRF lanes might not be exploited. Those skilled in the art will recognize, however, that SRF and LRF could in principle be merged into a single shared memory, portions of which are reserved for per-thread local storage.

Further, while the SRF and constants memory embodiments described herein implement banks as single-ported RAMs, one or more multi-ported memories could also be used to implement a shared memory, at some additional cost in terms of chip area.

Thus, although the invention has been described with respect to specific embodiments, it will be appreciated that the invention is intended to cover all modifications and equivalents within the scope of the following claims.

What is claimed is:

1. A method for accessing a memory in a processor core, the method comprising:
generating, in parallel, a plurality of requests to access a memory having a plurality of addressable storage locations, wherein each request specifies a target address in the memory;
selecting one of the target addresses as a broadcast address;
transmitting the broadcast address to the memory;
accessing the data stored at the broadcast address; and
distributing the data in parallel to each of the processing engines that generated a request specifying the broadcast address as the target address.

2. The method of claim 1 further comprising:
in the event that one or more of the requests specifies an address other than the broadcast address, regenerating the one or more requests that specify an address other than the broadcast address.

3. The method of claim 2 wherein data is not distributed to processing engines that generated a request not specifying the broadcast address as the target address.

4. The method of claim 3 further comprising:
serializing the plurality of requests from the plurality of processing engines.

5. The method of claim 4 further comprising:
permitting each of the requests specifying the broadcast address as the target address to proceed.

6. The method of claim 5 further comprising:
issuing a same instruction from a sequence of instructions in parallel to all of the processing engines, wherein the sequence of instructions includes a first instruction to request access to the memory.

7. The method of claim 6 wherein distributing the data in parallel to each of the processing engines is done using a distribution bus adapted to receive data read from the selected target address in the memory and to distribute the data to each of the processing engines whose request was permitted to proceed.

8. The method of claim 3 wherein requests have a priority ranking and the target address of the request with the highest priority is selected as the broadcast address.

9. The method of claim 3 wherein the processor core is in a graphics processor and the memory is adapted to store a plurality of rendering constants.

10. The method of claim 3 wherein the requests are generated by processing engines and the processing engines have only read access to the memory.

11. A processor core comprising:
- a plurality of processing engines to generate, in parallel, a plurality of requests to access a memory having a plurality of addressable storage locations, wherein each request specifies a target address in the memory;
- serialization logic to select one of the target addresses as a broadcast address, and to transmit the broadcast address to the memory; and
- a distribution bus to access the data stored at the broadcast address, and distribute the data in parallel to each of the processing engines that generated a request specifying the broadcast address as the target address.

12. The processor core of claim 11 wherein the distribution bus does not distribute the data to processing engines that generated a request not specifying the broadcast address as the target address.

13. The processor core of claim 12 wherein the serialization logic is further adapted to signal the instruction unit to issue the first instruction again to any of the processing engines for which the request did not specify the broadcast address.

14. The processor core of claim 13 wherein the serialization logic further permits all of the plurality of requests that specify the selected target address to proceed in parallel.

15. The processor core of claim 14 further comprising a distribution bus adapted to receive data read from the selected target address in the memory and to distribute the data to each of the processing engines whose request was permitted to proceed.

16. The processor core of claim 13 wherein requests have a priority ranking and the target address of the request with the highest priority is selected as the broadcast address.

17. The processor core of claim 13 wherein the processor core is in a graphics processor.

18. The processor core of claim 13 wherein the requests are generated by processing engines and the processing engines have only read access to the memory.

19. A processor core comprising:
- a plurality of processing engines to generate a plurality of requests to read a memory, the memory having a plurality of addressable storage locations, wherein each request specifies a target address in the memory;
- serialization logic to select one of the target addresses and to provide the selected target address to the memory; and
- a distribution bus to read the data stored at the selected target address, and distribute the data in parallel to each of the processing engines that generated a request specifying the selected target address.

20. The processor core of claim 19 wherein the distribution bus does not distribute the data to processing engines that generated a request not specifying the selected target address, and wherein the serialization logic is further adapted to signal the instruction unit to issue the first instruction again to any of the processing engines for which the request did not specify the selected target address.

* * * * *